US010088594B2

United States Patent
Paulsen et al.

(10) Patent No.: US 10,088,594 B2
(45) Date of Patent: Oct. 2, 2018

(54) METHODS AND APPARATUSES FOR ECHO PROCESSING OF NUCLEAR MAGNETIC RESONANCE (NMR) DATA

(71) Applicant: Schlumberger Technology Corporation, Sugar Land, TX (US)

(72) Inventors: Jeffrey L. Paulsen, Brookline, MA (US); Martin D. Hurlimann, Newton, MA (US); Julius Kusuma, Somerville, MA (US); Brian E. Boling, Sugar Land, TX (US); Soumyajit Mandal, Cambridge, MA (US); Brian Gaddis, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 589 days.

(21) Appl. No.: 14/516,425

(22) Filed: Oct. 16, 2014

(65) Prior Publication Data

US 2016/0109613 A1    Apr. 21, 2016

(51) Int. Cl.
*G01V 3/00* (2006.01)
*G01V 3/38* (2006.01)
*G01V 3/32* (2006.01)

(52) U.S. Cl.
CPC . *G01V 3/38* (2013.01); *G01V 3/32* (2013.01)

(58) Field of Classification Search
USPC ........................................................ 324/309
See application file for complete search history.

(56) References Cited

U.S. PATENT DOCUMENTS

| | | | |
|---|---|---|---|
| 3,597,681 A | 8/1971 | Huckabay et al. | |
| 4,443,760 A | 4/1984 | Edelstein et al. | |
| 4,710,713 A | 12/1987 | Strikman | |
| 5,243,288 A * | 9/1993 | Mori | G01R 33/3415 324/314 |
| 5,363,041 A | 11/1994 | Sezginer | |
| 5,585,720 A | 12/1996 | Edwards | |
| 5,739,691 A * | 4/1998 | Hoenninger, III | G01R 33/3621 324/307 |
| 6,097,184 A * | 8/2000 | Flaum | G01N 24/081 324/303 |
| 6,242,912 B1 * | 6/2001 | Prammer | G01N 24/081 324/303 |
| 6,297,632 B1 | 10/2001 | Speier | |

(Continued)

OTHER PUBLICATIONS

International Search Report issued in related PCT application PCT/US2015/055707 dated Dec. 28, 2015, 4 pages.

(Continued)

*Primary Examiner* — Rodney Fuller

(57) ABSTRACT

A nuclear magnetic resonance (NMR) system includes a transmitter of an NMR tool to output a magnetic field pulse into a zone of interest, a receiver of the NMR tool to output an NMR echo data set produced from an interaction of the magnetic field pulse and the zone of interest, and an NMR echo processing module including a filter matched to a response of the NMR tool to output a filtered NMR echo data set from the NMR echo data set, wherein the filter is matched to an echo shape of the NMR echo data, is matched to an average of a selected signal spectra of the NMR echo data set, or dynamically changes in response to a measurement.

20 Claims, 10 Drawing Sheets

(56) References Cited

U.S. PATENT DOCUMENTS

| | | | | |
|---|---|---|---|---|
| 7,795,869 B1* | 9/2010 | Bydder | ............... | G01R 33/482 |
| | | | | 324/307 |
| 2003/0050557 A1* | 3/2003 | Susil | ................... | A61B 5/055 |
| | | | | 600/424 |
| 2004/0008027 A1* | 1/2004 | Prammer | ............... | G01V 3/32 |
| | | | | 324/303 |
| 2005/0248342 A1* | 11/2005 | Rottengatter | ........... | G01V 3/32 |
| | | | | 324/303 |
| 2008/0024128 A1* | 1/2008 | Song | .................. | G01N 24/081 |
| | | | | 324/307 |
| 2011/0227570 A1 | 9/2011 | Anand et al. | | |
| 2012/0001629 A1* | 1/2012 | Hopper | .................. | G01V 3/32 |
| | | | | 324/303 |
| 2013/0080102 A1 | 3/2013 | Seydoux et al. | | |
| 2013/0207655 A1* | 8/2013 | Biber | .................. | G01R 33/341 |
| | | | | 324/321 |
| 2016/0045725 A1* | 2/2016 | Rump | .................... | A61N 1/08 |
| | | | | 607/119 |

OTHER PUBLICATIONS

International Preliminary Report on Patentability issued in PCT application PCT/US2015/055707 dated Apr. 18, 2017, 8 pages.
Hurlimann, Martin D., Encoding of diffusion and T1 in the CPMG echo shape: Single-shot D and T1 measurements in grossly inhomogeneous fields. Journal of Magnetic Resonance vol. 184, Issue 1, Jan. 2007, pp. 114-129.

\* cited by examiner

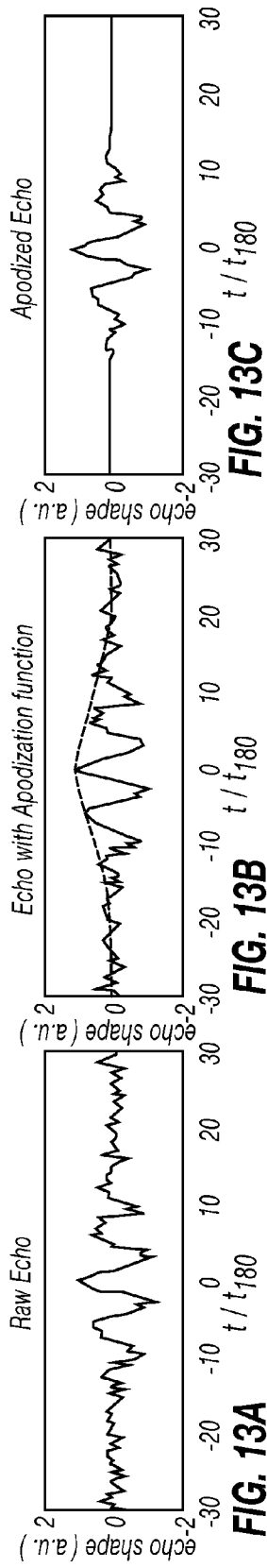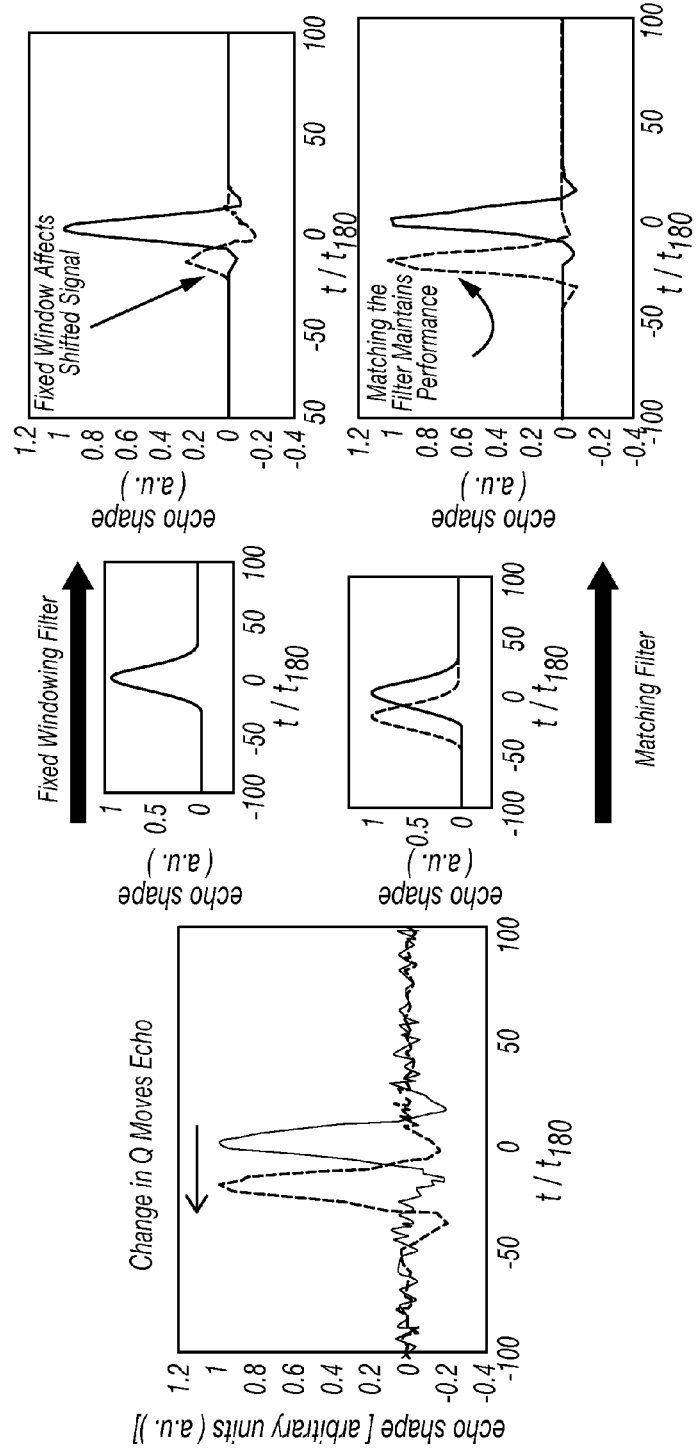

METHODS AND APPARATUSES FOR ECHO PROCESSING OF NUCLEAR MAGNETIC RESONANCE (NMR) DATA

BACKGROUND

1. Technical Field

The present disclosure relates generally to nuclear magnetic resonance (NMR) and, more specifically, to techniques for processing of NMR echo data.

2. Background Information

This section is intended to introduce the reader to various aspects of art that may be related to various aspects of the subject matter described and/or claimed below. This discussion is believed to be helpful in providing the reader with background information to facilitate a better understanding of the various aspects of the present disclosure. Accordingly, it should be understood that these statements are to be read in this light, not as admissions of prior art.

Logging tools may be used in wellbores to make, for example, formation evaluation measurements to infer properties of the formations surrounding the borehole and/or the fluids in the formations. Common logging tools include electromagnetic tools, nuclear tools, acoustic tools, and nuclear magnetic resonance (NMR) tools, though various other types of tools for evaluating formation properties are also available.

Early logging tools were run into a wellbore on a wireline cable after the wellbore had been drilled. Modern versions of such wireline tools are still used. However, as the demand for (e.g., real-time) information while drilling a borehole continued to increase, measurement-while-drilling (MWD) tools and logging-while-drilling (LWD) tools have since been developed. MWD tools typically provide drilling parameter information such as weight on the bit, torque, temperature, pressure, direction, and inclination. LWD tools typically provide formation evaluation measurements such as resistivity, porosity, NMR distributions, and so forth. MWD and LWD tools often have characteristics common to wireline tools (e.g., transmitting and receiving antennas, sensors, etc.), but MWD and LWD tools may be designed and constructed to endure and operate in the environment of drilling.

NMR tools used in well logging generally measure, among other things, relaxation times, such as longitudinal relaxation times ($T_1$) or transverse relaxation times ($T_2$), of formation fluids, which may range from a fraction of a millisecond to several seconds. NMR data may be used to determine properties of a zone of interest, e.g., substance thereof.

SUMMARY

A summary of certain aspects disclosed herein is set forth below. It should be understood that these aspects are presented merely to provide the reader with a brief summary of certain aspects and that these aspects are not intended to limit the scope of this disclosure. Indeed, this disclosure may encompass a variety of aspects that may not be set forth in this section.

In accordance with one aspect, a nuclear magnetic resonance (NMR) system includes a transmitter of an NMR tool to output one or a plurality of magnetic field pulses (e.g., pulse sequence) into a zone of interest, a receiver of the NMR tool to output an NMR echo data set produced from an interaction of the magnetic field pulse(s) and the zone of interest, and an NMR echo processing module including a filter matched to a response of the NMR tool to output a filtered NMR echo data set from the NMR echo data set.

In accordance with another aspect, a method of processing a nuclear magnetic resonance (NMR) echo data set includes providing from an NMR tool the NMR echo data set produced from an interaction of one or a plurality of magnetic field pulses (e.g., pulse sequence) and a zone of interest, matching a filter to a response of the NMR tool, and filtering the NMR echo data set with the filter to produce a filtered NMR echo data set.

In accordance with yet another aspect, an apparatus includes a processor, and a data storage device that stores instructions that, when executed by the processor, causes the processor to perform the following: providing from an NMR tool an NMR echo data set produced from an interaction of one or a plurality of magnetic field pulses (e.g., pulse sequence) and a zone of interest, matching a filter to a response of the NMR tool, and filtering the NMR echo data set with the filter to produce a filtered NMR echo data set.

In accordance with another aspect, an NMR echo processing module includes means to match a filter to a signal, e.g., to a response of an NMR tool that produced the signal. In accordance with yet another aspect, the NMR echo processing module also includes non-NMR measurements (e.g., temperature, salinity, etc.) and prior NMR measurements to determine the matched filter(s) to be applied. In accordance with another aspect, a method for NMR echo processing is as described herein. A system and/or method to determine formation porosity may include an NMR echo processing module as described herein.

Again, the brief summary presented above is intended to familiarize the reader with certain aspects and contexts of aspects of the present disclosure without limitation to the claimed subject matter.

BRIEF DESCRIPTION OF DRAWINGS

The present disclosure is illustrated by the following detailed description when read with the accompanying figures. It is emphasized that, in accordance with standard practice in the industry, various features are not necessarily drawn to scale. In fact, the dimensions of various features may be arbitrarily increased or recued for clarity of the discussion.

FIG. 13A is a graph of an example of a full (e.g., raw) echo of a CPMG decay.

FIG. 13B is a graph of an apodization function and the full, raw echo of the CPMG decay of FIG. 13A.

FIG. 13C is a graph of the apodization of the echo from FIG. 13B.

FIG. 14A is a graph of an example of an echo shifted by a change in the quality factor (Q) of an antenna.

FIG. 14B are graphs of a fixed, non-matched window filter (top graph) and an adjusted, matching filter (bottom graph).

FIG. 14C are graphs of a shifted echo after filtering with the fixed, non-matched window filter (top graph) and after filtering with the adjusted, matching filter (bottom graph) of FIG. 14B.

DETAILED DESCRIPTION

One or more specific aspects of the present disclosure are described below. These aspects are merely examples of the presently disclosed techniques. Additionally, in an effort to provide a concise description of these aspects, all features of an actual implementation may not be described in the specification. It should be appreciated that in the development of any such implementation, as in any engineering or design project, numerous implementation-specific decisions are made to achieve the developers' specific goals, such as compliance with system-related and business-related constraints, which may vary from one implementation to another. Moreover, it should be appreciated that such development efforts might be complex and time consuming, but would nevertheless be a routine undertaking of design, fabrication, and manufacture for those of ordinary skill having the benefit of this disclosure.

When introducing elements of various aspects of the present disclosure, the articles "a," "an," and "the" are intended to mean that there are one or more of the elements. The aspects discussed below are intended to be examples that are illustrative in nature and should not be construed to indicate that the specific aspects described herein are necessarily preferential in nature. Additionally, it should be understood that references to "one aspect" or "an aspect" within the present disclosure are not to be interpreted as excluding the existence of additional aspects that also incorporate the recited features.

Figure 1:
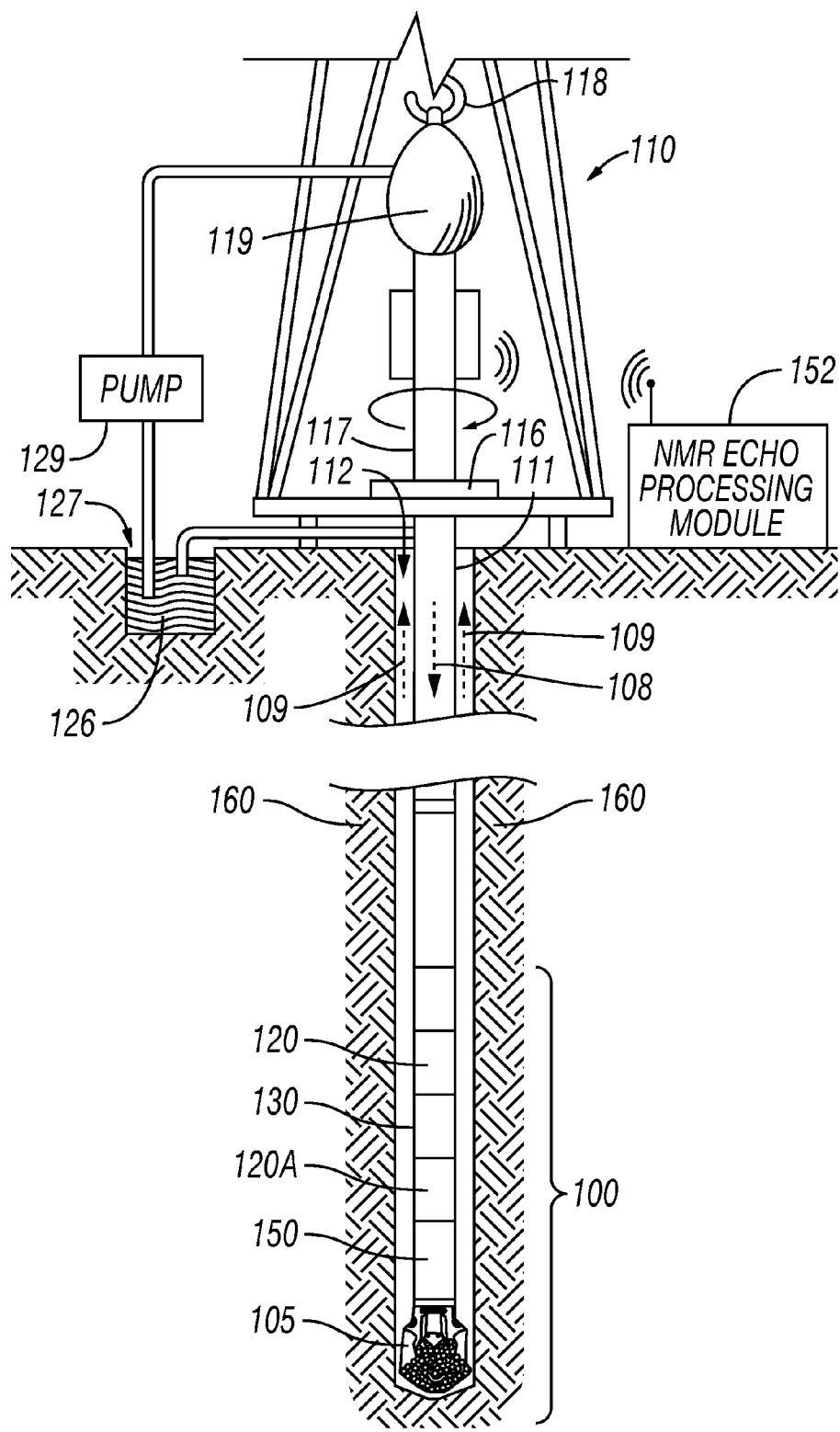
FIG. 1 is a schematic diagram of a well site system that may be used for implementation of an example aspect.

FIG. 1 represents a simplified view of a well site system in which various aspects of this disclosure may be employed. The well site system depicted in FIG. 1 may be deployed in either onshore or offshore applications. In this depicted system, a borehole 111 is formed in a subsurface formation 160 by rotary drilling in a manner that is well known to those skilled in the art. Some aspects may also use directional drilling.

Depicted drill string 112 is suspended within the borehole 111 and has a bottom hole assembly (BHA) 100 which includes a drill bit 105 at its lower end. The surface system includes a platform and derrick assembly 110 positioned over the borehole 111, with the assembly 110 including a rotary table 116, kelly 117, hook 118, and rotary swivel 119 (which in certain aspects may be part of a topdrive drilling motor). In a drilling operation, the drill string 112 may be rotated, e.g., by the rotary table 116 or a topdrive motor. Depicted drill string 112 is suspended from a hook 118, attached to a traveling block (not shown), through the rotary swivel 119 which permits rotation of the drill string 112 relative to the formation 160.

Drilling fluid (e.g., mud) 26 may be stored in a pit 127 formed at the well site. Depicted pump 129 pumps the drilling fluid 126 into the bore of the drill string 112, which causes the drilling fluid 126 to flow downwardly through the drill string 112, as indicated by the directional arrow 108 in FIG. 1. The drilling fluid may exit the drill string 112 via ports in the drill bit 105, and then circulate upwardly through the annulus formed between the outside of the drill string 112 and the inner wall of the borehole 111, as indicated by the directional arrows 109. In this known manner, the drilling fluid may lubricate the drill bit 105 and carry formation cuttings up to the surface as it is returned to the pit 127 for recirculation. In certain aspects, a downhole mud motor 150 may be utilized to rotate the drill bit 105.

Depicted drill string 112 includes a BHA 100 having one measurement while drilling (MWD) module 130 and multiple logging while drilling (LWD) modules 120 (with reference character 120A depicting a second LWD module 120). A single MWD module, a single LWD module, or any combination thereof may be utilized. As used herein, the term "module" as applied to MWD and LWD devices generally refers to either a single tool or a suite of multiple tools contained in a single modular device. Additionally, the depicted BHA 100 includes a rotary steerable system (RSS) including a mud motor 150 to rotate a drill bit 105.

LWD module(s) may be housed in a drill collar and may include one or more types of logging tools. For example, a LWD module may include capabilities for measuring, processing, and storing information, as well as for communicating with the surface equipment. By way of example, the LWD module 120 may include a nuclear magnetic resonance (NMR) logging tool, and may include capabilities for measuring, processing, and/or storing information and/or for communicating (e.g., wirelessly or via mud pulse) with surface equipment. An NMR echo processing module 152 may include a nuclear magnetic resonance (NMR) logging tool, and may include capabilities for measuring, processing, and/or storing information and/or for communicating (e.g., wirelessly or via mud pulse) with the downhole equipment. Although the NMR echo processing module 152 is depicted at the surface of the formation 160, portions of or the entire NMR processing module may be disposed in the borehole 111, e.g., with the drill string 112.

Depicted MWD module 130 is also housed in a drill collar, and may contain one or more devices for measuring characteristics of the drill string and drill bit. A MWD module 130 may include one or more of the following types of measuring devices: a weight-on-bit measuring device, a torque measuring device, a vibration measuring device, a shock measuring device, a stick/slip measuring device, a direction measuring device, and an inclination measuring device (the latter two sometimes being referred to collectively as a D&I package). The BHA 100 may further include an apparatus (not shown) for generating (e.g., electrical)

power for the downhole system. For example, power generated by the MWD tool 130 may be used to power the MWD tool 130 and/or the LWD tool(s) 120. In some aspects, this apparatus may include a mud turbine generator powered by the flow of the drilling fluid 126. It is understood, however, that other power systems (e.g., a battery) may be employed.

The operation of the assembly 110 of FIG. 1 may be controlled using a control system, e.g., located at the surface. A control system may include one or more processor-based computing systems. A processor may include a microprocessor, programmable logic devices (PLDs), field-gate programmable arrays (FPGAs), application-specific integrated circuits (ASICs), system-on-a-chip processors (SoCs), or any other suitable integrated circuit capable of executing encoded instructions stored, for example, on tangible computer-readable media (e.g., read memory, random access memory, a hard drive, optical disk, flash memory, etc.). Such instructions may correspond to, for instance, workflows and the like for carrying out a drilling operation, a logging operation, algorithms and routines for processing data received at the surface from the BHA 100 (e.g., as part of an inversion to obtain one or more desired formation parameters), and so forth.

NMR echo processing module may include one or more processor-based computing systems. An NMR echo processing module may be hardware, software, firmware, or any combination thereof. For example, an NMR echo processing module may include software, such as stored as NMR echo processing module routine 1504 in FIG. 15, to generate an NMR data set (e.g., including generating a filtered echo data such as, but not limited to, amplitude and/or phase of echo(s)) as discussed herein.

Before discussing the echo processing techniques set forth in this disclosure, some background with respect to the operation of NMR logging tools is first provided. NMR well logging tools are typically used to measure the properties of nuclear spins in the formation, such as the longitudinal (or spin-lattice) relaxation time (generally referred to as $T_1$), transverse (or spin-spin) relaxation time (generally referred to as $T_2$), and diffusion coefficient (D) as well as to determine the porosity of the formation from the NMR echo signal amplitude(s). Knowledge of these NMR properties may help aid in determination of basic formation properties such as permeability and porosity, as well as the fluid properties such as fluid type and viscosity.

For example, an NMR operation may include applying a static magnetic field to the substance, e.g., the formation. The static magnetic field may generate an initial magnetization of atomic nuclei within the substance. Then, an NMR system may be used to apply an oscillating magnetic field at a particular frequency to the substance. The oscillating field may be composed of a sequence of pulses that tip the magnetization of the atomic nuclei away from the initial magnetization. The sequence of pulses may be arranged so that pulses and the static field interact with the nuclei to produce a resonant signal composed of "echoes" (e.g., spin echoes) within at least a portion of the substance. These echoes (e.g., their amplitude, duration [time], and/or phase) may be sensed and recorded to form an NMR echo data set.

By way of background, NMR well logging tools, e.g., LWD tool 120 of FIG. 1, may use permanent magnets to create a strong static magnetic (e.g., polarizing) field inside the formation. The hydrogen nuclei of certain fluids (e.g., water and hydrocarbons) are electrically charged spinning protons that create a weak magnetic field similar to tiny bar magnets. When a strong external magnetic field (e.g., from the logging tool) passes through a formation containing these fluids, the spinning protons align themselves like compass needles along the magnetic field. This process, called polarization, increases as an exponential recovery with $T_1$ (longitudinal relaxation time) to its equilibrium strength in the external magnetic field (generally referred to as the $B_0$ field) applied by the logging tool.

Figure 2:
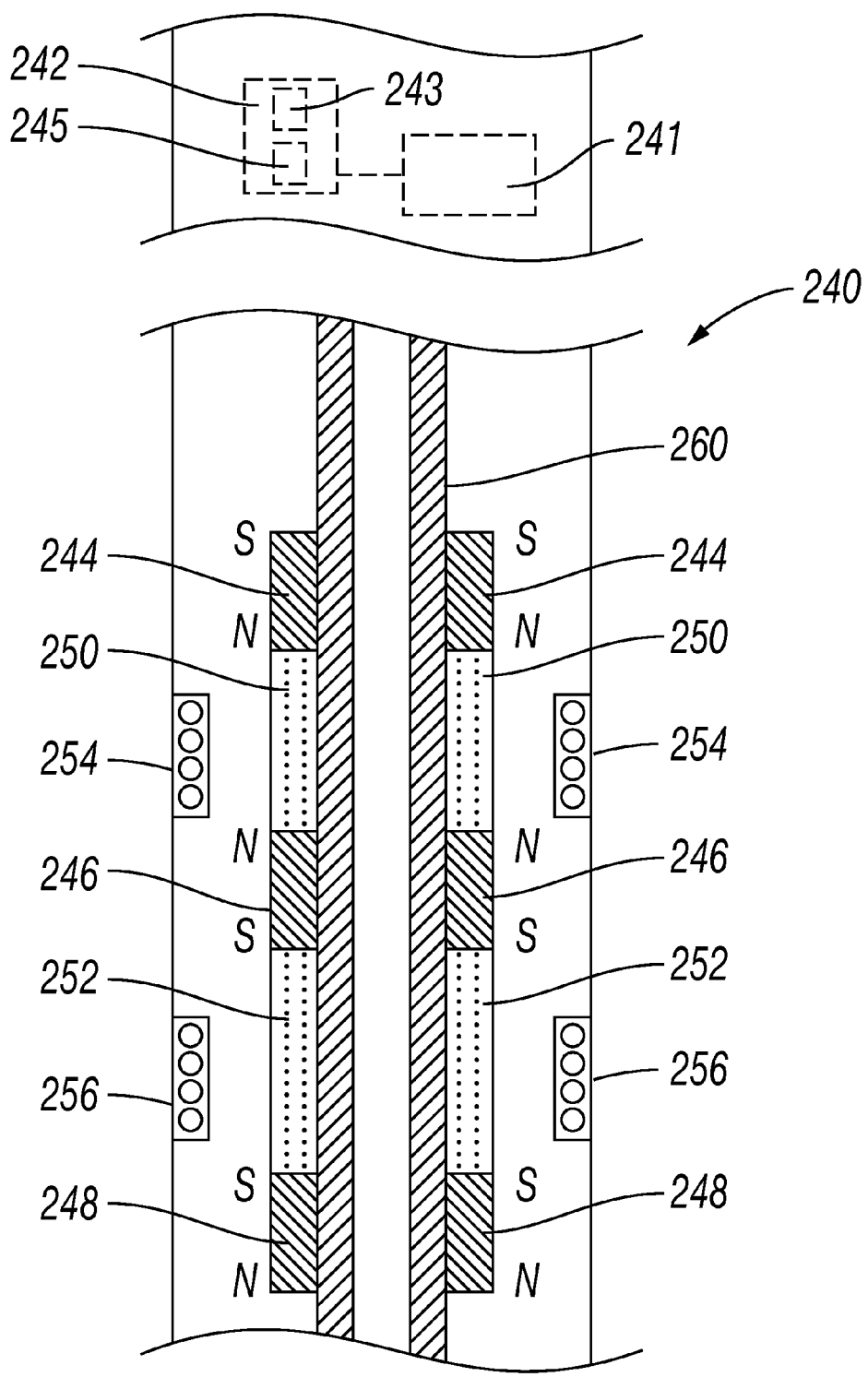
FIG. 2 is an example aspect of a nuclear magnetic resonance (NMR) logging tool that may be used in the well site system of FIG. 1.

FIG. 2 shows an example of an NMR logging tool 240. As an example, the illustrated device in FIG. 2 may be used as the LWD tool 120 or part of an LWD tool suite 120A. Depicted NMR tool 240 includes upper 244, middle 246, and lower 248 permanent magnets that circumscribe an inner protective sleeve 260 of the NMR tool 240. The upper 244 and middle 246 magnets may produce a radial, axisymmetric static $B_0$ field, and the middle 246 and lower 248 magnets may produce another radial, axisymmetric static $B_0$ field. Because, as an example, the upper 244 and middle 246 magnets are closer together than the middle 246 and lower 248 magnets, the upper $B_0$ field may have a higher gradient (and thus, is more sensitive to motion) than the lower $B_0$ field. In some aspects, the north poles of magnets 244 and 246 may face each other to furnish a $B_0$ field that has contour lines that extend radially away from the longitudinal axis of the NMR tool 240; and similarly, the south poles of magnets 246 and 248 may face each other to furnish a $B_0$ field that has contour lines that extend radially into the longitudinal axis of the NMR tool 240. In some aspects, e.g., to produce more uniform $B_0$ fields, the NMR tool 240 may include magnetically permeable sleeves 250 and 252 that circumscribe tie sleeve 260 and may be positioned between the upper 244 and middle 246 magnets and between the middle 246 and lower 248 magnets, respectively.

Among the other features of the illustrated NMR tool 240 are that the tool 240 may include a radio frequency (RF) coil 254 which acts as an antenna to transmit data (e.g., magnetic field pulses, such as $B_1$ pulses) into the formation and to receive spin echo signals for the upper $B_0$ field and/or an RF coil 256 to transmit data, e.g., $B_1$ pulses, into the formation and to receive spin echo signals for the lower $B_0$ field. The coils 254 and 256 may be coupled to electronic circuitry 242 of the NMR tool 240 that includes, among other things, $B_1$ pulse generators 243 and/or a memory 245 to store NMR data (e.g., echo data that includes indications of the received spin echoes) for example, before transmitting the NMR data uphole. Electronic circuitry 242 may be coupled to a motion device 241 (e.g., an accelerometer, strain gauge, ultrasonic finder and/or a magnetometer) that indicates motion of the NMR tool. This indication may be further processed by the electronic circuitry 242, e.g., before being transmitted uphole in some aspects.

Any NMR tool may be utilized according to various aspects of this disclosure. For example, an NMR tool may include a transmitter to transmit an NMR signal. For example, an NMR tool may include a receiver to receive an NMR signal. For example, an NMR tool may include a transmitter to transmit an NMR signal and a receiver to receive a different NMR signal. A receiver may have its own antenna or utilize a transmitter's antenna (e.g., when the transmitter is not transmitting).

In operation, NMR data (e.g., echo data) may be acquired by any means known in the art. In one aspect, measurements are obtained by applying a second oscillating magnetic field (generally referred to as the $B_1$ field) as a series of pulses from an antenna (e.g., coil 54 in FIG. 2) of the NMR tool, which may be followed by or interleaved with data acquisition (e.g., sensing the NMR echo data from the interaction of the magnetic field pulses and the formation). These pulses may be or be based on the Carr-Purcell-Meiboom-Gill (CPMG) pulse sequence or other variants, in which trains of spin echoes are generated by a series of pulses (e.g., a sequence of pulses).

In one aspect, transmitted magnetic field pulses cause the aligned protons to tip into a plane perpendicular (e.g., transverse) to the direction of the polarization field (e.g., $B_0$). These tipped protons will start to precess, as is known in the art of NMR, around the direction of the strong logging-tool magnetic field at a frequency called the Larmor frequency. In one aspect, such precessing protons create an oscillating magnetic field which generates weak radio signals at this frequency. The total signal (e.g., amplitude) from the precessing hydrogen nuclei (e.g., a few microvolts) may be a measure of the total hydrogen content, or porosity, of the formation. The rate at which the precession decays is generally referred to as the transverse relaxation time ($T_2$), which may be indicative of the rate at which the spinning protons lose their alignment within the transverse plane. The transverse relaxation time ($T_2$) may depend on certain factors, such as: the intrinsic bulk-relaxation rate in the fluid, the surface-relaxation rate, which is an environmental effect, and relaxation from diffusion in a polarized field gradient, which is a combination of environmental and tool effects.

In one aspect, NMR measurements are performed in applied fields that are homogeneous across the sample. In such cases, the information of the measurement may be encoded in the frequency content of the generated magnetization that relates to the chemical or spatial composition of the sample. For this reason, that data analysis generally includes a Fourier transformation. However, certain aspects (e.g., downhole in a well) may be directed to NMR measurements in inhomogeneous fields. In certain aspects, the inhomogeneity of the static magnetic field across a sample (e.g., the zone of interest) may be comparable or even larger than the amplitude of the RF field. In this case, the frequency content of the magnetization of the generated echoes may depend on the pulse sequence applied. For a CPMG sequence, the shapes of the initial echoes may vary from echo to echo, but for higher echo number the echoes may quickly assume an asymptotic shape that is independent of the echo number. In this aspect, the information may be encoded in the amplitude of these echoes. In one basic CPMG sequence, the transverse relaxation time may be extracted from the measured decay of the amplitudes of the echoes. By modifying the basic CPMG sequence, for instance by preceding the sequence by a single or a series of pulses and/or by replacing the initial excitation pulse by a different pulse or a series of pulses, it is possible to encode other types of information on the echo amplitudes, including $T_1$, $T_2$, or diffusion. For such applications, at least one parameter (e.g., a time interval, a pulse duration, a pulse amplitude, or a gradient pulse) in the pulse sequence may be systematically varied. The amplitudes of the echoes may then be analyzed as a function of this parameter and/or the echo number. In certain aspects, it is possible to generate a superposition of two types of echoes (with distinct shapes) with different sensitivity to the desired parameter to be measured.

In one general case, the resulting magnetization $m^{(i)}_{j,k}$ of the i-th echo may be written as:

$$m^{(i)}_{j,k,\ldots}(t-t_i) = \sum_n a_n^{(i)}(j,k,\ldots)s_n(t-t_i),$$

where j and k indicate possible parameters that may be systematically changed from sequence to sequence, t indicates the time of interest, $t_i$ indicates the nominal time of the i-th echo, n identifies the type of echo that has been generated in the sequence (n=1, 2, . . . N), and $s_n(t-t_i)$ indicates the associated shape of this echo. The shape $s_n(t-t_i)$ may be either calculated by knowledge of the pulse sequence and the details of the NMR tool used. In another aspect, it is possible to calibrate these shapes experimentally. In one aspect, the amplitudes $a_n^{(i)}(j,k)$ are extracted in an optimal manner from the measured signal.

The measured signal may not correspond directly to the generated magnetization $m^{(i)}j,k$, but it may correspond directly to the voltage that is generated at the output, e.g., of the spectrometer. In the frequency domain, the measured signal $S^{(i)}j,k$ may be related to the generated magnetization by $S^{(i)}j,k(\omega)=D(\omega)m^{(i)}j,k(\omega)$. Here $D(\omega)$ refers to the transfer function of the NMR tool, e.g., a spectrometer thereof. This transfer function may depends on external parameters, such as the temperature and the salinity of the sample.

In one aspect, there is knowledge of the shapes $s_n(t-t_i)$ and $D(\omega)$ may be monitored dynamically. In certain aspects, the characteristics of the noise may be monitored (e.g., detected). Given certain of the above information, in one aspect, a the amplitudes $a_n^{(i)}(j,k)$ may be produced (e.g., extracted) from the measured signal generated by the given pulse sequence at the output of the spectrometer. In another aspect, from these amplitudes, physical quantities of the zone of interest may be inferred, such as distribution functions of transverse relaxation time, longitudinal relaxation time, and/or diffusion coefficient by applying an inversion routine. These physical quantities may then be related to various petrophysical quantities, e.g., as discussed herein.

Diffusion coefficients (D) may be measured by the application of a temporary additional gradient in the magnetic field or the use of a constant gradient in the polarization field (e.g., $B_0$). Diffusion coefficients (D) may be measured by applying a set of oscillating magnetic field pulses with variable non-pulse durations in between to encode the diffusive attenuation in spin echo amplitudes. In one aspect, a fixed gradient of magnetic field is applied and the NMR system varies the delay between RF pulses. Further, the above NMR echo data and any other NMR data (e.g., of differing measurement types) may be combined to obtain information regarding the formation and/or the fluids present therein. For instance, $T_2$ and D measurements may be combined to obtain two-dimensional information on formation fluids. In another example, $T_2$ and $T_1$ measurements may be combined as well. In general, any NMR measurements including but not limited to the above examples may be combined to obtain multi-dimensional information on the formation or formation fluids.

Once the desired NMR data is acquired, a mathematical (e.g., inversion) process may be applied to determine the distribution of measured properties that reflects the anisotropy of formation or formation fluids. For example, the $T_2$ distribution may represent the distribution of pore sizes within the formation, and the area under $T_2$ curve may represent the pores filled with formation fluids. Interpretation of pore size distribution and logarithmic mean $T_2$ may be used for calculating various petrophysical parameters, such as permeability and the amount of free and/or bound fluid.

One commonly used inversion scheme for NMR well logging tools is based on a non-negative least squares method to derive the distribution of one or more measured properties. The method includes the formulation of a forward model, commonly referred to as a kernel or kernel function. For example, when using a CPMG pulse sequence, the amplitude of the $k^{th}$ echo (ignoring polarization and diffusion effects) may be given as:

$$\overline{m_k} = \sum_{j=1}^{NT_2} a_j e^{-\frac{k \cdot t_e}{T_{2j}}} \quad (1)$$

where $NT_2$ represents the number of components in the $T_2$ distribution, $a_j$ and $T_{2j}$ represent the amplitude and relaxation time, respectively, of component j, and $t_e$ represents the echo spacing. The overbar over the magnetization symbol m indicates it is reconstructed.

The kernel function K may be an $NE \times NT_2$ matrix, whose elements in the simplest case may be expressed as:

$$K_{kj} = e^{-\frac{k \cdot t_e}{T_{2j}}} \quad (2)$$

In Equation (2), the kernel function $K_{kj}$ shows the response of the k-th echo at a decay rate of $T_{2j}$. Each row in that matrix corresponds to an echo and includes information on how it responds to decay rates. When the NMR data contains other sources of signal decay in addition to those attributable to $T_2$ relaxation, such as $T_1$ relaxation or diffusion coefficient (D), the above-mentioned kernel may be extended to accommodate such additional decays. These additional decays may be analytically formulated based on tool design and pulse sequence used.

Referring above to Equation (1), when written in matrix form, Equation (1) may be rewritten as (with bold characters referring to a vector):

$$m = K \cdot a \quad (3)$$

The inversion process typically minimizes an objective function $\epsilon^2$, such as:

$$\varepsilon^2 = \sum_{k=1}^{NE} (\overline{m_k} - m_k)^2 \quad (4)$$
$$= (m - K \cdot a)^T \cdot (m - K \cdot a)$$

where NE is the number of echoes in the CPMG echo train and the superscript T means transpose (e.g., interchanging the rows and columns of the matrix). The resulting solution, a, which is a matrix of $T_2$ components (a $T_2$ distribution), may be given by:

$$a = (K^T \cdot K)^{-1} \cdot K^T \cdot m \quad (5)$$

As will be appreciated, in some inversions of this type, a non-negativity constraint may be applied to the components of a. In addition, regularization and/or compression may also be applied.

Although certain aspects herein are described in the analog/continuous-time domain, the disclosure is not so limited. E.g., the disclosed methods and apparatuses may be used in the digital/discrete-time domain or both in the analog/continuous-time and in digital/discrete-time domains. For example, a digital-to-analog converter (DAC) and/or an analog-to-digital converter (ADC) may be utilized. As further example, two independent quantities may be quantized here: time and amplitude (e.g., voltage/current). In certain aspects, all four possible combinations of analog/digital and continuous-time/discrete-time may be utilized.

Figure 3:
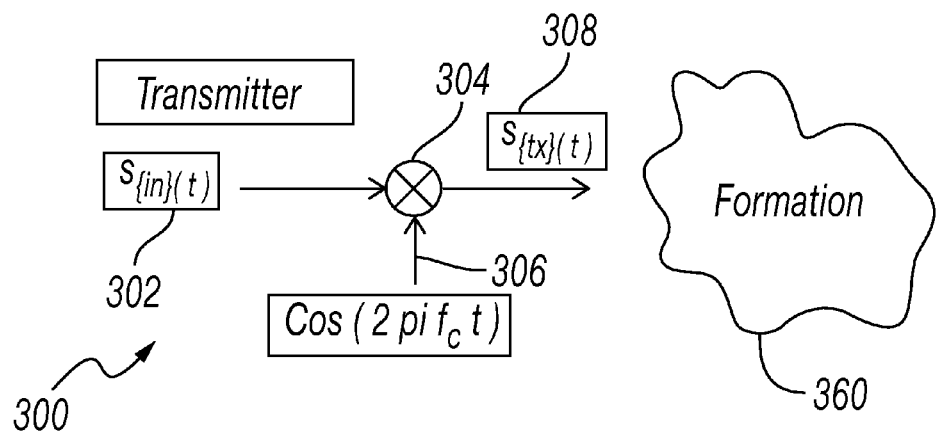
FIG. 3 is a schematic diagram of a transmitter according to one aspect of the disclosure.

Turning to FIG. 3, an NMR transmitter 300 is schematically depicted with an input signal (e.g., pulse) $s_{\{in\}(t)}$ 302, e.g., as described herein, that is modulated (e.g., by a multiplication mixer 304, which may refer to any non-linear multiplication circuit) by a carrier wave at a frequency of "$f_c$". In one aspect, the frequency $f_c$ may be any desired frequency. In one aspect, the pulse s(t) is a Gaussian (e.g., shaped) pulse. In one aspect, a signal $s_{\{in\}(t)}$ 302 is referred to as a baseband signal (e.g., pulse). A signal, e.g., a pulse, may refer to a radio frequency (RF) pulse or an electromagnetic (EM) pulse.

Depicted input signal (e.g., pulse) $s_{\{in\}(t)}$ 302, may be a time varying signal (e.g., a baseband signal) modulated in mixer 304 by carrier wave of cosine (i.e., "cos") of [2*pi*$f_c$*t] that is a time varying signal to produce an output signal (e.g., pulse) $s_{\{tx\}(t)}$ 308, that is a time varying signal (e.g., a passband signal). In one aspect, signal $s_{\{tx\}(t)}$ 308 is referred to as a transmitted passband output signal (e.g., pulse) of a transmitter. The symbol t as used herein generally refers to time, e.g., the time domain. Pi as used herein refers to the mathematical constant π. Modulation may include multiplying an input signal amplitude and a carrier signal (e.g., wave) amplitude at each instant in time to output a momentary product amplitude signal for that instant in time, which may also be done for a range of times to produce a data set of output amplitude signals. Output signal (e.g., pulse) $s_{\{tx\}(t)}$ 308 may then be applied (e.g., inputted into) to a formation 360 (which may be formation 160 of FIG. 1 or any other formation). In one aspect, an NMR magnetic field signal (e.g., pulse) may be applied to (e.g., transmitted into) a zone of interest (e.g., formation) using a logging tool, such as, but not limited to, a transmitter in a module of a BHA, e.g., a LWD NMR module. In another aspect, $s_{\{in\}(t)}$ may be directly synthesized such that it is already modulated at $f_c$, e.g., eliminating the need for the mixer as then $s_{\{in\}(t)} = s_{\{tx\}}(t)$.

In NMR applications, e.g., oil well wireline logging (WL) and LWD, the applied NMR signal (e.g., the transmitted NMR magnetic field pulse $s_{\{tx\}(t)}$) may be repeatedly applied to refocus the magnetization to form echoes which may be collected (e.g., by a receiver) and analyzed as an NMR echo data set.

In one aspect, the transmitted signal $s_{\{tx\}(t)}$ is a sequence of pulses (e.g., RF pulses), each of which may be written as:

$$s_{\{tx\}(t)} = s_{\{in\}(t)} \cdot \cos(2\pi f_c t + \varphi)$$

In some aspects, the envelope of the transmitted pulse ($s_{\{in\}(t)}$) and/or the transmitted frequency ($f_c$) or phase ($\varphi$) may vary, for example, as in adiabatic pulses. In one aspect, the received signal $s_{\{rx\}}$ (e.g., ignoring any time delay) is a sequence of pulses (e.g., RF pulses), each of which may be written as:

$$s_{\{rx\}(t-\tau)} = A \cdot s_{\{lar\}(t-\tau)} \cdot \cos(2\pi f_l t + \varphi)$$

In this aspect, the frequency $f_l$ is the Larmor frequency. Note that the frequency $f_c$ herein generally refers to the transmitter frequency, and $f_c$ and $f_l$ may be substantially equal. Finally, in another aspect, the received signal may also be written as:

$$s_{\{rx\}(t-\tau)} = A \cdot s_{\{out\}(t-\tau)} \cdot \cos(2\pi f_{mix} t + \varphi)$$

In this aspect, the frequency $f_{mix}$ is a frequency which the received signal is mixed to. The $s_{\{tx\}(t)}$ in these aspects are the full waveforms of the pulse sent by the transmitter (tx)

and the full waveform of the signal echo detected by the receiver. It further follows that $s_{\{in\}(t)}$ and $s_{\{lar\}(t)}$ are the are pulse and echo shapes at the transmitter (tx) and receiver (rx) respectively, whereas $s_{\{out\}}$ is the received signal after mixing, and A is the amplitude (e.g., amplitude scaling) at each echo, with τ denoting the occurrence time of a particular pulse. The measurement from a matched filter of received signal (e.g., echo) amplitudes $a_k$ may be used to generate formation properties, such as porosity.

In one aspect, when a signal includes the term cos(2*π*$f_l$*t), the signal is in passband. In another aspect, when the signal is includes the term cos(2*π*$f_I$*t) where $f_I$ is substantially different from $f_l$ or $f_c$ (for example $f_I$=1/5 $f_c$), it is at an intermediate frequency, e.g., an intermediate frequency signal. In one aspect, when a signal includes (e.g., is) the pulse shape and amplitude, the signal is in baseband. In another aspect, the Larmor (e.g., resonant) frequency is the carrier frequency of a modulated signal. In one aspect, the transmitter pulse shape $s_{\{in\}(t)}$ is a square pulse and the received shape of the echo signal $s_{\{lar\}(t)}$ is not a square pulse shape. The shape of the received echo may depend on the formation and environmental conditions experienced by the NMR tool. In this disclosure, processing methods and apparatuses are disclosed to match a response of the NMR tool (e.g., to match a filter of these methods and apparatuses to a response of an NMR tool such as the characteristics of the received pulse shape $s_{\{lar\}(t)}$, which may be obtained either through design, modeling, and/or based on observation of the operation of the NMR tool) with one goal of maximizing measurement quality of that response, e.g., SNR. As the echo shape $s_{\{lar\}(t)}$ may be a desired measurement to obtain with a matched filter.

The transmitted excitation signal, e.g., a sequence of pulses, may be represented in passband as:

$$s_{\{tx\}(t)} = \sum_k s_{\{in\}(t-t_k)} \cdot \cos(2\pi f_c t + \phi)$$

And ignoring propagation delay, the received echo signal, e.g., also including a sequence of pulses, may be represented as a complex passband signal:

$$s_{\{rx\}(t)} = \sum_k a_k \cdot s_{\{out\}(t-t_k)} \cdot \cos(2\pi f_c t + \varphi) + j \cdot b_k \cdot s_{\{out\}(t-t_k)} \cdot \sin(2\pi f_c t + \varphi)$$

In baseband (bb), the transmitted excitation signal (e.g., $s_{\{tx\}(t)}$) and received echo signal (e.g., $s_{\{rx\}(t)}$) signals may be represented as:

$$s_{\{tx\}(t)} = \sum_k s_{\{in\}}(t-t_k)$$

$$s_{\{rx\}(t)} = \sum_k c_k \cdot s_{\{out\}}(t-t_k)$$

Where $c_k = a_k + j*b_k$ and $j = \sqrt{-1}$, $a_k$ is the real portion of the baseband, and $b_k$ is the imaginary portion of the baseband.

In one aspect, to obtain the (e.g., complex) baseband signal from a passband signal, a mixer may be used. Although not depicted, a mixer may be followed by a lowpass filter and/or an image rejection filter, then followed by the matching filter. In one aspect, the image rejection filter may be part of the matching filter, e.g., by matching to the received pulse shape and also to the characteristic of the image resulting from the mixer. In another aspect, the measurement noise may be used to match the filter thereto such according data.

The matching of a filter to a response of an NMR tool may include convolution of data or through an inner product or windowing. According to one aspect, windowing, e.g., a Gaussian window without summation but instead followed by Fourier transformation, is an operation in the art of NMR spectroscopy and MRI imaging in order to trade-off resolution and SNR in the obtained spectra (or image). However, in these applications great care is made to control the homogeneity and stability of the polarization field ($B_0$) and so these filters are not designed to the particular response of the instrument past that of a homogenous field. In the case of an NMR logging tool (e.g., including a permanent magnet), such homogeneity and capacity to stabilize the polarization field may not be practical, and the filter may be designed to respond according to some knowledge or expectation signal response and noise profile of the NMR device.

To further illustrate an aspect of the filtering operation, consider a signal $r(t)=A \cdot s_{\{lar\}(t)}$, e.g., where $s_{\{lar\}(t)}$ may be the baseband signal (so $f_I=f_c$), to be used to determine the (complex) amplitude A. For example, computing the inner product or windowing:

$$y(\tau) = \int_{-\infty}^{\infty} w(\tau) r(\tau) d\tau = \int_{-\infty}^{\infty} w(\tau) A \cdot s(\tau) d\tau = A \int_{-\infty}^{\infty} w(\tau) s(\tau) d\tau$$

If both w(t) and the shape of $s_{\{lar\}(t)}$ are known, then A may be calculated from y. For example, if r(t) is corrupted by additive white Gaussian noise, then w(t) may be chosen to be the same as $s^*_{\{lar\}(t)}$. Further, the computation above may be achieved through inner product, windowing, or sampling the output of a filter by choosing a filter h(t) based on the windowing function w(t) such that h(T−t)=w(t).

In one aspect, w(t) is chosen to be a square pulse, even though $s_{\{lar\}(t)}$ may not be a square pulse. In some aspects, the shape of $s_{\{lar\}(t)}$ may not be known, but it may be approximated as a Gaussian function or a truncated Gaussian function.

A new computation of y may be done via filtering r(t) data using a filter h(−t). Thus, in some aspects, the matched filter $h(-t)=s^*_{\{lar\}(t)}$, or equivalently $s^*_{\{lar\}(-t)}$, where the asterisk denotes the complex conjugate.

In some aspects, in baseband processing the shape $s^*_{\{lar\}(t)}$ is the response of the NMR tool utilized in the matching of filter h(t), and in passband processing the shape and the Larmor frequency component $s_{\{lar\}(t)} \cos(2 \pi f_l t)$ are cumulatively the response of the NMR tool utilized in the matching of filter h(t).

Figure 4:
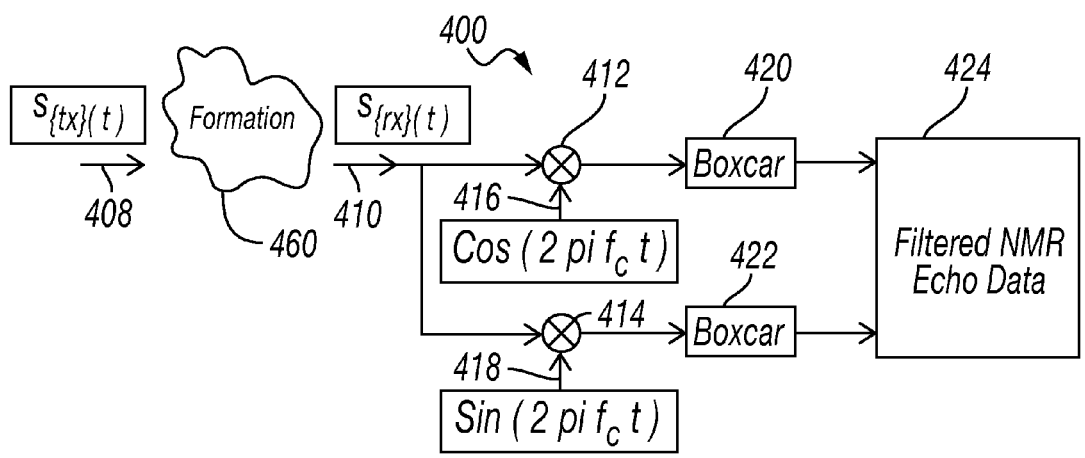
FIG. 4 is a schematic diagram of an NMR echo processing module according to one aspect of the disclosure.

Turning to FIG. 4, a schematic of an NMR echo processing module 400 is depicted. Magnetic field signal (e.g., pulse) $s_{\{tx\}(t)}$ 408 is output into a zone of interest, e.g., into formation 460 from a transmitter. A receiver may receive data (e.g., a data set) $s_{\{rx\}(t)}$ 410 of the interaction of the magnetic field signal (e.g., pulse) $s_{\{tx\}(t)}$ 408 and the zone of interest, e.g., formation 460. A received data set 410 may be radio frequency signals. Received data set 410 may be radio frequencies (e.g., resonant signals) composed of "echoes" (e.g., spin echoes) and may be referred to as an NMR echo data set. Depicted signal (e.g., echo) $s_{\{rx\}(t)}$ 410 is input into the NMR echo processing module 400. Depicted NMR echo processing module 400 includes two mixers (412, 414) which each receive NMR echo data (e.g., data set) 410. Depicted signal (e.g., echo) $s_{\{rx\}(t)}$ 410, may be a time varying signal (e.g., a passband signal) demodulated in mixer 412 by carrier wave of cosine (i.e., "cos") of [2*pi*$f_c$*t] 416 that is a time varying signal to produce a signal (e.g., echo) that is a time varying signal (e.g., a baseband signal). Depicted signal (e.g., echo) $s_{\{rx\}(t)}$ 410, may be a time varying signal (e.g., a passband signal) demodulated in mixer 414 by carrier wave of sine (i.e., "sin") of [2*pi*$f_c$*t] 418 that is a time varying signal to produce a signal (e.g., echo) that is a time varying signal (e.g., a baseband signal). Mixers (412, 414) may each demodulate an input signal $s_{\{rx\}(t)}$ concurrently. In one aspect, signal $s_{\{rx\}(t)}$ 410 is referred to as a received passband signal (e.g., echo) output from a receiver. In one aspect, output from demodulation (e.g., mixer 412) with cosine may be referred to as the real portion of the baseband, i.e., "Re". The output from demodulation (e.g., mixer 414) with sine may be referred to as the imaginary portion of the baseband, i.e., Im. Cumulatively the complex baseband may be referred to as Re+j*Im, where j=$\sqrt{-1}$. Demodulation may include multiplying an input signal amplitude and a carrier signal amplitude at each instant in time to output a momentary product amplitude signal for that instant in time, which may also be done for a range of times to produce a data set of output amplitude signals. Depicted output from each mixer (412, 414) flows into Boxcar filters (420, 422; respectively), e.g., effectively taking a sum of the acquired data to arrive at a filtered NMR echo data (e.g., data set) 424. However, a Boxcar filter is a moving average filter (i.e., it is zero over the entire time except for a single interval where it is equal to a constant which is generally referred to as the acquisition or observation window) and thus it may be considered to be independent of the shape of a time varying received signal (e.g., echo), that is, a Boxcar filter is a non-matched filter. In some aspects, the performance of a Boxcar filter, e.g., used to filter NMR echo data to determine the echo amplitude, duration, and/or phase) may degrade as the acquisition (e.g., observation) window length is increased. Degradation may refer to having a lower peak signal-to-noise ratio at one acquisition (e.g., observation) window length compared to a second (e.g., longer) acquisition (e.g., observation) window length.

Figure 5:
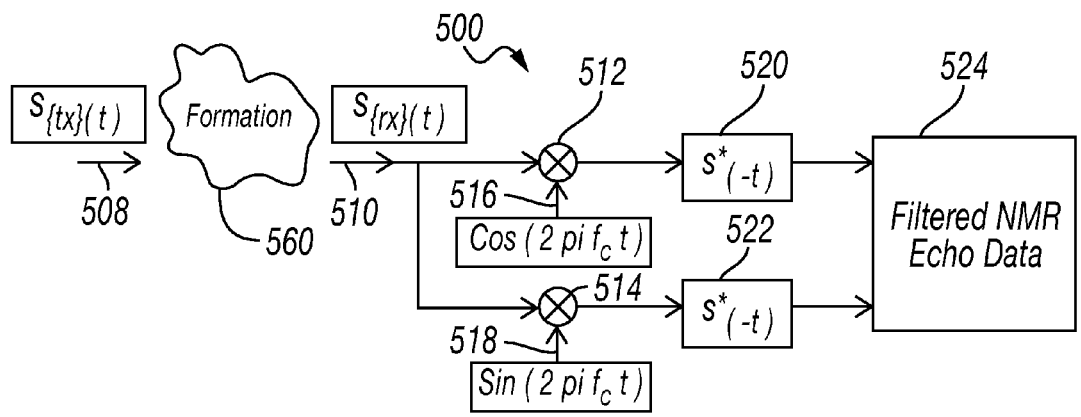
FIG. 5 is a schematic diagram of an NMR echo processing module according to another aspect of the disclosure.
Figure 6:
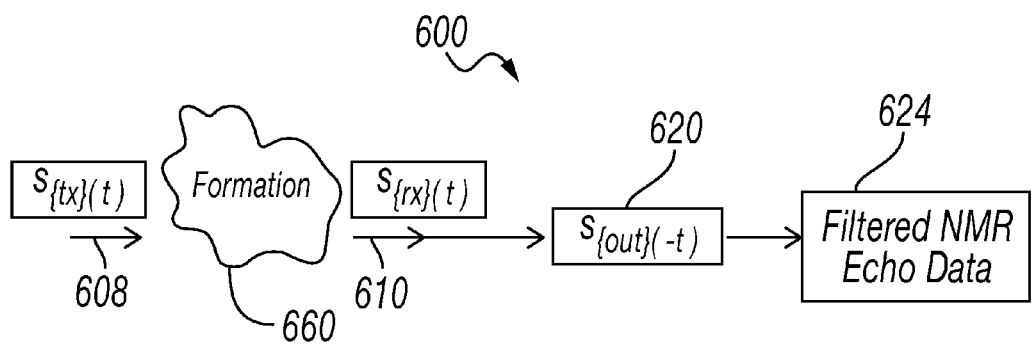
FIG. 6 is a schematic diagram of an NMR echo processing module according to yet another aspect of the disclosure.

Turning now to FIGS. 5 and 6, depicted NMR echo processing modules (500, 600) include filters matched to a signal response of an NMR tool.

FIG. 5 is a schematic of an NMR echo processing module 500. A magnetic field signal (e.g., RF-pulse) $s_{\{tx\}(t)}$ 508 is transmitted into a zone of interest, e.g., into formation 560 from a transmitter. A receiver may receive signal (e.g., a data set) $s_{\{rx\}(t)}$ 510 resulting from the interaction of the magnetic field signal (e.g., pulse) $s_{\{tx\}(t)}$ 508 and the zone of interest, e.g., formation 560. A received data set 510 may be radio frequency signals. Received data set 510 may be radio frequencies (e.g., resonant signals) composed of "echoes" (e.g., spin echoes) and may be referred to as an NMR echo data set. Data set (e.g., echo signals) may be received (e.g., detected) with a receiver's antenna such as a coiled wire. A receiver and a transmitter may use the same antenna. Depicted signal (e.g., echo) $s_{\{rx\}(t)}$ 510 is input into the NMR echo processing module 500, e.g., by a receiver of the module. NMR echo processing module 500 includes two mixers (512, 514) which each receive NMR echo data (e.g., signals collectively forming a data set) 510. Depicted signal (e.g., pulse) $s_{\{rx\}(t)}$ 510, may be a time varying signal (e.g., a passband signal) demodulated in mixer 512 by carrier wave of cosine (i.e., "cos") of [2*pi*$f_c$*t] 516 that is a time varying signal to produce a signal (e.g., pulse) that is a time varying signal (e.g., a baseband signal). Depicted signal (e.g., pulse) $s_{\{rx\}(t)}$ 510, may be a time varying signal (e.g., a passband signal) demodulated in mixer 514 by carrier wave of sine (i.e., "sin") of [2*pi*$f_c$*t] 518 that is a time varying signal to produce a signal (e.g., pulse) that is a time varying signal (e.g., a baseband signal). Frequency $f_c$ may be the Larmor frequency $f_l$ or substantially equal. In one aspect, signal $s_{\{rx\}(t)}$ 510 is referred to as a received passband signal (e.g., pulse) output from a receiver. In one aspect, output from demodulation (e.g., mixer 512) with cosine may be referred to as the real portion of the baseband, i.e., "Re". The output from demodulation (e.g., mixer 514) with sine may be referred to as the imaginary portion of the baseband, i.e., Im. Cumulatively the complex baseband (e.g., signal) may be referred to as Re+j*Im, where j=$\sqrt{-1}$. Demodulation may include multiplying an input signal amplitude and a carrier signal amplitude at each instant in time to output a momentary product amplitude signal for that instant in time, which may also be done for a range of times to produce a data set of output amplitude signals. Depicted output from each mixer (512, 514) goes to a matched filter (520, 522; respectively), e.g., effectively taking a sum of the filtered data to arrive at a filtered NMR echo data (e.g., data set) 524. In contrast to a Boxcar filter, a matching filter may be varying over an interval (e.g., not constant) which is generally referred to as the acquisition or observation window and thus the matching filter may be considered to be dependent on the shape of a time varying signal, that is, a matched filter.

In another aspect, a received signal (e.g., $s_{\{rx\}(t)}$ 510) may be mixed (e.g., demodulated) to an intermediate frequency (e.g., not to baseband) via a single mixer (e.g., 512) followed by a matched filter (e.g., 520) to output filtered NMR echo data. The matched filtering may include convolution or a window function as discussed herein. Filtered NMR echo data may then undergo additional processing to create a complex baseband signal, e.g., Re+j*Im.

In some aspects, the performance of a matching filter (e.g., used to filter NMR echo data to determine the echo amplitude, duration, and/or phase) may improve as the acquisition (e.g., observation) window length is increased. Improvement may refer to having a higher peak signal-to-noise ratio at one acquisition (e.g., observation) window length compared to a second (e.g., shorter) acquisition (e.g., observation) window length. A matching filter may be matched (e.g., fit to maximize SNR or other factors) to the expected or measured response for the NMR pulse sequence (e.g., a single magnetic field pulse or series of pulses as in the CPMG) input into a zone of interest (e.g., a formation) to produce the NMR echo data set (e.g., discrete or continuous signals of that data set). For example, the filter may be matched to a baseband signal by having the baseband signal $s_{\{out\}(t)}$, for example, from a recording of it, or by estimating the baseband signal $s_{\{out\}(t)}$, and convolving (e.g., over an acquisition (observation) window length of duration $T_a$) that (e.g., input or received) signal $s_{\{out\}(t)}$ (e.g., as $s_a(\tau)$ or $s(\tau)$ as discussed herein) with the received echo data set (e.g., signals) $s_{\{rx\}(t)}$ to determine the matched impulse response $h_m(t)$ of the filter (e.g., matching the filter to the input and output data from a formation). The matched impulse response $h_m(t)$ may then be transformed, e.g., from the time domain $h_m(t)$ to the frequency domain $H_M(\omega)$, and the signal (e.g., $s_a(t)$) may then be transformed, e.g., from the time domain $s_a(t)$ to the frequency domain $S_a(\omega)$, and the echo signal amplitude(s) calculated by integrating $Y_M(\omega)$, where $Y_M(\omega)=H_M(\omega)*S_a(\omega)$, with respect to d between negative infinity and infinity, e.g., as discussed below, to provide the filtered echo signal amplitude(s) $s_M$. Matching a filter may include having knowledge of the carrier frequency (e.g., "$f_c$") or determining the carrier frequency, for example, to utilize the carrier frequency in a mixer to demodulate an echo data signal (e.g., received $s_{\{rx\}(t)}$ or $Y(\omega)$) with it.

As a further example of NMR tool responses, a filter may be matched to a magnetic field (e.g., input into the zone of interest) pulse by demodulating a received echo data set (e.g., signals) with a mixer (e.g., before the filter or as part of the filter) to remove a Larmor resonant frequency from the NMR echo data set. A matched filter may be matched to a baseband signal of the transmitter or receiver. A filter may be matched by (e.g., before the filter or as part of the filter) converting the NMR echo data set with a mixer into a complex baseband signal before separate filters are applied accordingly to each of the real and imaginary components of the complex baseband signal. A matched filter may retain (e.g., not remove) a Larmor resonant frequency in the NMR echo data set. A filter may be matched to a passband output signal of the transmitter. A matched filter may be applied to a passband signal of the NMR echo data set. A filter may be matched (e.g., to provide a fit) to at least one of a noise, propagation, and ghosting value, or combinations thereof. An NMR echo processing module may include a mixer to convert the NMR echo data set into a complex baseband signal before the matching filter is applied to the complex baseband signal. A filter may be matched to an average of a selected signal spectra, e.g., of the NMR echo data set. A filter may be matched to a Gaussian function. An NMR echo processing module may include a whitening filter (e.g., as part of or separate from the matching filter) for example, to convert colored noise in the NMR echo data set to white noise. A filter may be matched to the transmitter's input or output magnetic field pulse to maximize a peak signal-to-noise ratio. A filter may include a point-by-point windowing or apodization function, e.g., instead of performing a convolution. A filter may be a dynamic filter that dynamically changes (e.g., changes its impulse response) in response to a change in a measurement (e.g., that measurement exceeding a value, falling below a value, as a continuous function of that value or some combination of these). The measurement may be a signal strength of the received signal from the interaction of the magnetic field pulse sequence and the zone of interest. The measurement may include at least one of a quality factor (Q) of the antenna or the transmitter and/or receiver, a temperature of the transmitter and/or receiver, a magnetic field strength (e.g., $B_0$ and/or $B_1$), noise (e.g., colored and/or white noise), and a pulse power of the transmitter, or combinations thereof. An NMR echo processing module may select a single matched filter from a plurality of filters to maximize a (e.g., peak) signal-to-noise ratio of the selected filter or to detect a plurality of signals encoded within the echo.

FIG. 6 is a schematic of an NMR echo processing module 600. Magnetic field signal (e.g., pulse) $s_{\{tx\}(t)}$ 608 is output into a zone of interest, e.g., into formation 660 from a transmitter. A receiver may receive data (e.g., a data set) $s_{\{rx\}(t)}$ 610 of the interaction of the magnetic field signal (e.g., pulse) $s_{\{tx\}(t)}$ 608 and the zone of interest, e.g., formation 660. A received data set 610 may be radio frequency signals. Received data set 610 may be radio frequencies (e.g., resonant signals) composed of "echoes" (e.g., spin echoes) and may be referred to as an NMR echo data set. Data set (e.g., echo signals) may be received (e.g., detected) with a receiver's antenna such as a coiled wire. Depicted signal (e.g., pulse) $s_{\{rx\}(t)}$ 610 is input into the NMR echo processing module 600, e.g., a receiver antenna of the module. Depicted NMR echo processing module 600 does not include a mixer. NMR echo processing module 600 includes a matched filter $s_{\{out\}(-t)}$ 620. Filter 620 may be matched according to any aspect of this disclosure. Filter 620 may be matched (e.g., selecting a filter's impulse response to maximize SNR) to the NMR response to the output from a transmitter, e.g., input pulse sequence $s_{\{tx\}(t)}$ 608 and the other possible environmental conditions e.g., temperature, circuit Q, etc. Filter may be matched to a known signal response (e.g., a non-linear and history dependent response) to an input signal (e.g., $s_{\{tx\}(t)}$). Filter 620 may output a filtered NMR echo data set (e.g., the amplitude and/or phase of each echo). The filter may be matched based on time reversed data, e.g., –t, where –t generally refers to being time reversed as compared to the normal passage of time. While the above is in the time domain, a transform (e.g., the Laplace transform or Fourier transform) may be used to transform between a time domain and frequency domain.

In one aspect, a filter may be matched to a response of the NMR tool that is the echo shape of NMR echo data. For example, a filter may be matched (e.g., before use downhole) as discussed herein to an echo shape produced by an NMR transmitter and receiver and the same NMR transmitter and receiver may be used downhole to generate filtered NMR echo data. As another example, a filter may be matched to the coil resonance of the NMR tool utilized. As yet another example, a filter may be matched to the Larmor frequency (such that the mixer demodulation frequency is the Larmor frequency). In one aspect, the Larmor frequency is the Larmor frequency for the NMR tool in the downhole location where the NMR tool receiver receives an NMR echo data set. Matching may include matching the filter to a measured response of the NMR tool or an estimated or predicted response of the NMR tool. For example, multiple filters (e.g., generated in a testing environment) may each be matched for different measured quantities, such as, but not limited to, salinity of fluid the NMR tool is disposed in, the Q of any antennas used to transmit and/or received NMR signals, downhole temperature (e.g., the temperature of the NMR tool), a magnetic field strength, a pulse power of the transmitter, etc. In such aspects, a filter of the multiple filters may be (e.g., dynamically) selected (e.g., from a database of filters) to match the measurement, for example, using the downhole measurement value to select a filter generated for a match to a similar or the same measurement value.

Figure 7:
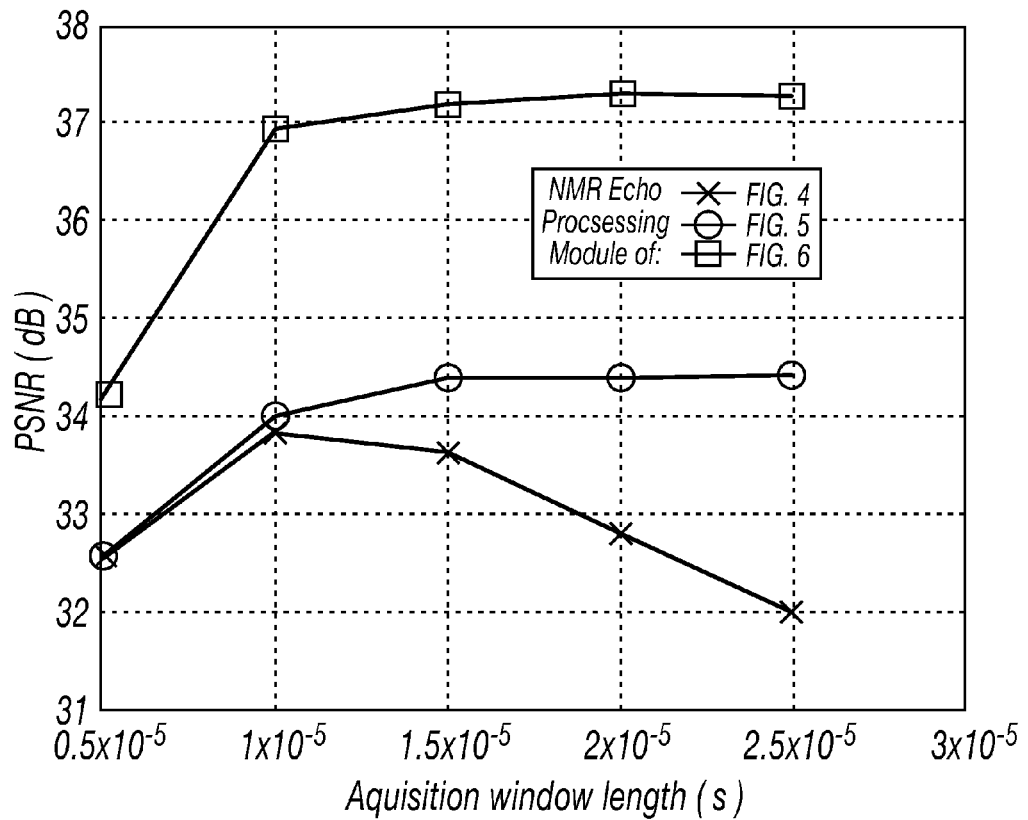
FIG. 7 is a graph illustrating filter performance of the modules in FIGS. 4-6 according to one aspect of the disclosure.

FIG. 7 depicts a graph showing the PSNR improvement for an example NMR echo data set filtered according to aspects of FIGS. 5 and 6 as compared to one aspect of FIG. 4 at increasing values of acquisition window length. Particularly, the vertical axis is the peak signal-to-noise ratio (PSNR) in decibels (dB) and the horizontal axis is the acquisition (e.g., observation) window length in seconds (s). The aspect of FIG. 4 illustrates in one example the performance of a matched (or matching or any other form of the word "match") filter of NMR echo processing modules of FIGS. 5 and 6 may improve monotonically with acquisition (e.g., observation) window length, e.g., a matched filter may produce a combination of optimal signal to noise and a consistent response with an increase in acquisition (e.g., observation) window length, as compared to the non-matched filter of the NMR echo processing module of FIG. 4. Improved performance here generally refers to having a higher (e.g., better) peak signal-to-noise ratio (PSNR) for a first filter as opposed to a second filter. PSNR is generally defined as the ratio of the peak signal power to the noise power, e.g., as measured in decibels (dB). Note that at $0.5 \times 10^{-5}$ seconds, the data point for the module of FIG. 5 is above the data point for the module of FIG. 4. In one aspect, the amount of PSNR improvement may depend on the parameter(s) of the signal, such as the Larmor frequency and pulse shape.

Figure 8:
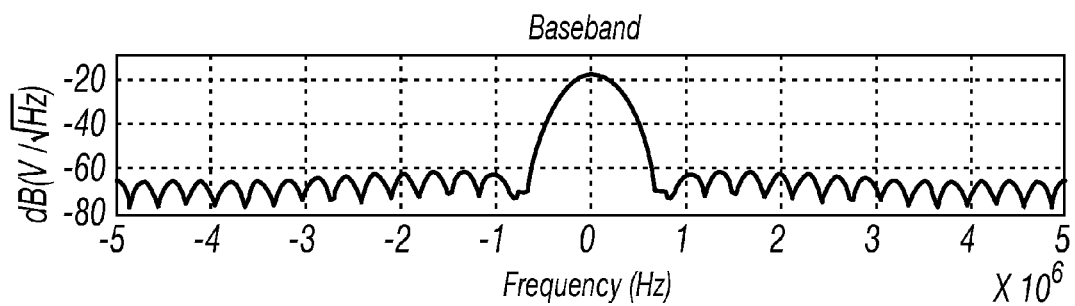
FIG. 8 is a graph illustrating for a receiver the baseband signal according to one aspect of the disclosure.
Figure 9:
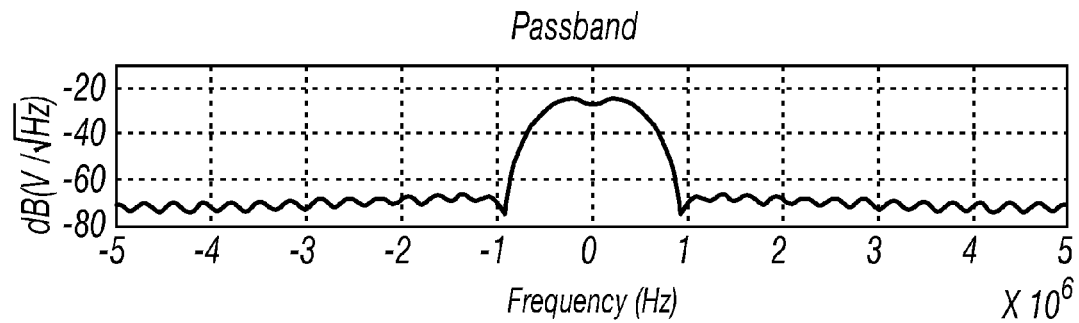
FIG. 9 is a graph illustrating for a receiver the passband signal according to one aspect of the disclosure.
Figure 10:
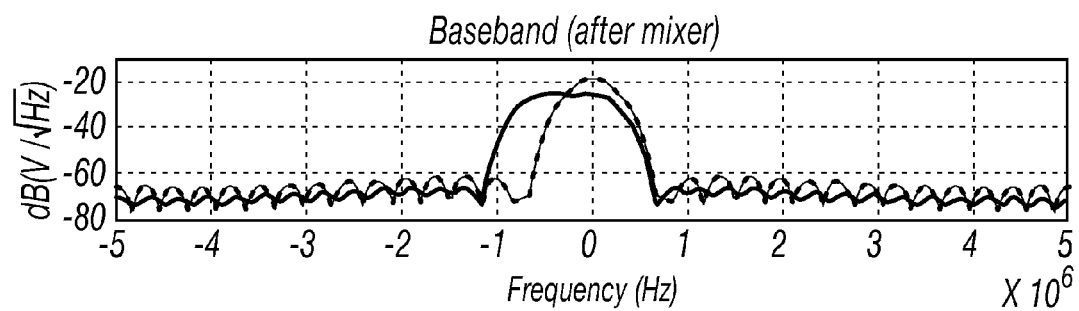
FIG. 10 is a graph illustrating a received, demodulated baseband signal and for that receiver the baseband signal according to one aspect of the disclosure.

FIG. 8 illustrates the spectrum of a baseband signal echo (e.g., input pulse) derived from the pulse envelope $s_{\{out\}(t)}$, in this case a Gaussian of a width of 4 μs. —and the Larmor frequency removed. Received pulse widths may be in the range of 4-50 μs, but may also span a far wider range (e.g., 0.5 μs-100 ms), for example, depending on the specific hardware and application, and in the case of inhomogeneous polarization fields $B_0$ as may be typical in logging tools, the width of the received echo signal may be similar to the transmitted pulse width. FIG. 9 illustrates the spectrum of a received passband signal $s_{\{rx\}}$ (e.g., carrier wave modulation of baseband signal s(t) of FIG. 8). FIG. 9 illustrates that in the frequency domain, the width of the pulse envelope and Larmor frequency may be such that there is substantial energy around the zero frequency. In one aspect, ignoring both the Larmor frequency and the pulse shape including its width, the received passband signal may be converted into baseband, and then the template baseband pulse shape or envelope may be applied. FIG. 10 illustrates the spectrum of a received (from a zone of interest) signal $s_{\{rx\}(t)}$ (e.g., NMR echo data signal) after demodulation by a mixer, e.g., as achieved with the NMR echo processing module in FIG. 5, as a solid line. For comparison, in FIG. 10 the spectrum of the baseband signal s(t) from FIG. 8 is superimposed as a dashed line. Due to a relatively small carrier frequency ($f_c$) (e.g., 250 kHz) in this example, the spectra of the positive and negative frequencies overlap in the passband signal thus some of the received signal is lost. After the mixer demodulates the received baseband signal, the depicted demodulated, received signal (i.e., the solid line) is inconsistent with the transmitted baseband signal (i.e., the dashed line). A matched filter may be provided to match (e.g., make the shapes substantially the same) the demodulated, received signal (e.g., NMR echo data set in the solid line) to the baseband signal (e.g., pulse s(t)). Such a matched filter may then be used to filter an NMR echo data set, for example, to determine (e.g., estimate) the echo amplitude and/or phase). Thus, by directly processing the received signal in passband rather than in baseband, in certain aspects the improvement shown on FIG. 7 may be obtained.

Performance of a matched (or matching or any other form of the word "match") filter may improve monotonically with acquisition (e.g., observation) window length, e.g., a matched filter may produce a combination of optimal SNR and a consistent response with an increase in acquisition (e.g., observation) window length. Improved performance may refer to having a higher (e.g., better) signal-to-noise ratio (SNR) for a first filter as opposed to a second filter. Improved performance may refer to having a higher (e.g., better) peak signal-to-noise ratio (PSNR) for a first filter as opposed to a second filter on the same data set. SNR is generally defined as the ratio of the signal power to the noise power, e.g., as measured in decibels (dB). A SNR or PSNR higher than 1:1 indicates more signal than noise. In certain aspects below, the NMR echo data set (e.g., $s_{\{rx\}(t)}$) is assumed to include additive white Gaussian noise (AWGN) however other noise characteristics may be present (e.g., added into the NMR echo data set).

Matching (or matched or any other form of the word "match") a filter may refer to various methods and apparatuses, as is discussed below in non-limiting examples. For example, according to one aspect, a filter is matched (e.g., via a processor) to the (e.g., transmitter output $s_{\{tx\}}$ or receiver input $s_{\{rx\}}$) transmitted magnetic field pulse. In one aspect, the optimum signal detector in the presence of additive white Gaussian noise (AWGN) is a matched filter. A matched filter may be a linear time-invariant (LTI) filter that is applied to real-time (e.g., streaming) data or a "window" filter that is applied to an existing (e.g., previously recorded) data set. For a filter with an impulse response h(t) applied to a signal s(τ), its output y(t) is given by convolving them:

$$y(t) = \int_{-T_a/2}^{T_a/2} s(\tau) h(t-\tau) d\tau$$
$$= \int_{-\infty}^{\infty} s_a(\tau) h(t-\tau) d\tau \equiv s_a(t) * h(t).$$

In this example, $s_a(t)=s(t)*w(t)$, where w(t) is the echo acquisition window of duration $T_a$. The acquisition window function may be assumed to be equal to 1 between $-T_a/2$ and $T_a/2$, and zero elsewhere. In order to match the filter (e.g., maximize the SNR in this example) at a particular time, e.g., t=0, for a particular output y(t) (e.g., NMR echo data $s_{\{rx\}(t)}$, the matched filter may have an impulse response $h_m(t)$ (e.g., amplitude and phase of the echo data in the time domain) that is a time-reversed version of $s_a*(t)$, e.g., $h_M(t)=s_a*(-t)$. Where (superscript) refers to the complex conjugate and -t generally refers to being time reversed as compared to the normal passage of time. While the above is in the time domain, a transform (e.g., the Laplace transform or Fourier transform) may be used to transform between a time domain and frequency domain.

In one aspect, a matched filter maximizes a response that is the value of SNR (e.g., at a particular time, time range, frequency, and/or frequency range) using an equation (e.g., relating SNR, impulse response of a filter, input signal into the filter, output signal from the filter, other response of the NMR tool, or any combination thereof, for example, as disclosed herein) relating the (e.g., variable) parameter of the filter (e.g., the impulse response of the filter in the time or frequency domain) to "fit" (or other mathematical minimization, maximization, or data fitting techniques such as least squares) the received NMR echo data set (e.g., $s_{\{rx\}(t)}$ in FIGS. 5 and 6), given the magnetic field pulse sequence transmitted into the zone of interest (e.g., s(t) in FIG. 3) and may also account for other measures of the local environment (e.g., temperature) and tool condition (e.g., Q and magnetic field strength). In another aspect, the equation (e.g., as recited herein) may depend on the received NMR echo data set (e.g., signal $s_{\{rx\}(t)}$ in FIGS. 5 and 6). This NMR echo data set may have the Larmor resonant frequency within the signal $s_{\{rx\}(t)}$, for example, as in the NMR echo processing module and associated methods in FIG. 6, or with the Larmor resonant frequency removed, for example, as in the NMR echo processing module and associated methods in FIG. 5.

In one aspect, a signal (e.g., an NMR echo data set of signals) may not include (e.g., exhibit) white Gaussian noise (WGN), for example, a signal produced from a narrow band probe of a receiver for example corresponding to the bandwidth of a tuned circuit (e.g., Q>40). An NMR probe may be considered to be narrow band when its 3 dB bandwidth, defined as PQ, is less than that of the received signals, e.g., the echoes. In grossly inhomogeneous fields the bandwidth of the echoes generated by standard CPMG-type sequences is approximately equal to $2f_1$, where $f_1=\omega/2\pi$ is known as the nutation frequency. The latter is equal to $\gamma B_1$, where γ is a constant, namely the gyromagnetic ratio of the nucleus being investigated (protons in this case) and $B_1$ is the amplitude of the circularly-polarized radio-frequency (RF) magnetic field imposed on the nuclei by the transmitter. In such aspects, the noise in the signal may be considered "colored", e.g., its frequency spectrum is not flat. In one aspect, white noise has a flat frequency spectrum, with flat referring to a generally horizontal line when the noise is plotted on a graph of amplitude (e.g., signal strength in dB on the vertical axis) versus the logarithmic frequency (e.g., in Hz on the horizontal axis). For example, the white noise portion of a signal may have equal power in any band of a given bandwidth (e.g., power spectral density) when the bandwidth is measured in Hz. As a further example, with a white noise signal, the range of frequencies between 40 Hz and 60 Hz may contain the same amount of power as the range between 400 Hz and 420 Hz since both intervals are 20 Hz wide.

According to one aspect, an NMR echo processing module may include a whitening filter, e.g., a filter to convert colored noise into white noise. The whitening filter may be part of the matched filter or a separate filter, e.g., a separate whitening filter receiving an NMR echo data set and outputting the whitened NMR echo data set to the matched filter. In one aspect, a whitening filter $H_w(\omega)$ (note the subscript "W" for whitening) is utilized on the NMR echo data before the matched filter $H_M(\omega)$ (note the subscript "M" for matching). A capital letter generally refers to a term (e.g., a constant or a variable) in an equation in the frequency domain and a lower case letter generally refers to a term in an equation in the time domain. As noted above, these (or other) domains may be transformed between by a transform. For example, a capital H here generally refers to the transfer function of a component (e.g., filter) in the frequency domain and a lowercase h here generally refers to the impulse response of a component (e.g., filter) in the time domain. According to one aspect, a whitening filter converts the colored noise $N(\omega)$ in an NMR echo data set (e.g., the signals cumulatively forming that data set) into white noise. A whitened NMR echo data set (e.g., the signals cumulatively forming that data set) may then be filtered by a matched filter to the signal after whitening, $H_M(\omega)$, e.g., as discussed above (e.g., to optimize the SNR). In one aspect, a whitening filter (e.g., the impulse response thereof) may be:

$$H_W(\omega) = \sqrt{\frac{N_{out}}{N(\omega)}},$$

where $N_{out}$ is the substantially constant (e.g., frequency-independent or white) noise power spectral density (PSD) at the output of the whitening filter. In one aspect, the PSD indicates the power contributed to the signal (e.g., wave), by a frequency per unit frequency (e.g., in watts per hertz (W/Hz)). In one aspect, a whitening filter may not be causal, e.g., it may depend on future inputs in addition to past inputs. In such an aspect, pre-recorded NMR echo data may be utilized to implement a non-causal whitening filter.

In one aspect, after the whitening operation, the whitened signal is given by $S_a(\omega)H_W(\omega)$, (where $S_a(\omega)$ refers to the un-whitened signal, such as a received NMR echo data set) so the matching filter is:

$$H_M(\omega) = [S_a(\omega)H_W(\omega)]^* = S_a^*(\omega)H_W^*(\omega)$$

and the whitening filter and matched (e.g., matching) filter may now be combined as a single filter $H_M'(\omega)$ that is given by:

$$H_M'(\omega) \equiv H_W(\omega)H_M(\omega) = S_a^*(\omega)|H_W(\omega)|^2$$

$$= N_{out}\left(\frac{S_a^*(\omega)}{N(\omega)}\right)$$

Thus the filtered signal amplitude ($s_M$) (e.g., echo signal amplitude) in this aspect is:

$$Y_M(\omega) = S_a(\omega)H_M'(\omega) = \frac{N_{out}|S_a(\omega)|^2}{N(\omega)}$$

$$S_M = \int_{-\infty}^{\infty} Y_M(\omega)\,d\omega = N_{out}\int_{-\infty}^{\infty}\frac{|S_a(\omega)|}{N(\omega)}\,d\omega = N_{out}\int_{-\infty}^{\infty}|SNR(\omega)|^2\,d\omega$$

This filtered signal amplitude ($s_M$) (e.g., echo signal amplitude) may be purely real and proportional to the integral of the signal-to-noise ratio (SNR) in power units as a function of frequency, e.g., in the frequency domain. An example of such a matched filter is shown in FIG. 11.

Figure 11:
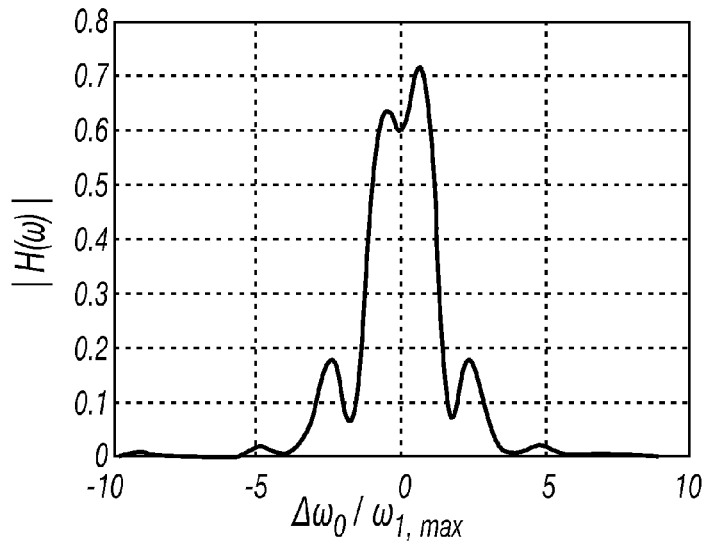
FIG. 11 is a graph of an example of a matched filter for a Carr-Purcell-Meiboom-Gill (CPMG) pulse sequence at low Larmor frequencies.

Particularly, FIG. 11 illustrates a graph of an example of a matched filter for a CPMG pulse sequence using a narrow band probe, for a nominal Larmor frequency of $\omega_0=2*\pi*250$ kHz, a probe quality factor of Q=60, a nutation frequency of $\omega_{1,max}=2*\pi*12.5$ kHz, a constant magnetic field gradient, and a constant RF field strength. In one aspect, the NMR signal frequency is given by $\omega=\omega_0+\Delta_0$, where $\Delta_0$ is the resonance offset frequency. The degrading effects of colored (e.g., non-white) noise may be increased when the bandwidth (BW) of the probe is comparable or smaller than that of the signal, e.g., in narrowband probes where $BW_{probe} \leq BW_{signal}$. In such cases, the noise PSD at a receiver may vary across the signal bandwidth. Such noise may affect the NMR echo data for high quality factor (high-Q) probes at low Larmor frequencies (since $BW_{probe}$ may be directly proportional to $\omega_0/Q$), and also when broadband pulse sequences increase the bandwidth of the NMR echo signal (e.g., the components of the NMR echo data set).

In one aspect, determination of a matching (e.g., matched) filter and/or whitening filter may include acquiring a noise spectrum and/or an acceptable signal spectrum. This acquisition may include modeling of the spectrum(spectra) as is known in the art. If there is more than one possible shape or spectrum, an average (or weighted average) of all or substantially all possible acceptable signal spectra may be utilized. In the absence of a model, a particular spectrum (spectra) shape may be utilized, such as the Gaussian (e.g., echo) shape. Selecting a whitening filter may include acquiring the noise spectrum. This noise spectrum may be acquired by measurement in the lab or by taking noise samples during use of the NMR system, e.g., during time periods when the NMR receiver is operating but not the transmitter. An NMR system and/or method may include a ($B_0$) magnetic field being inhomogeneous and wherein the sensitive volume is limited by the maximum RF strength ($B_1$) for the minimum inhomogeneity of $B_0$.

Figures 12A, 12B, 12C:
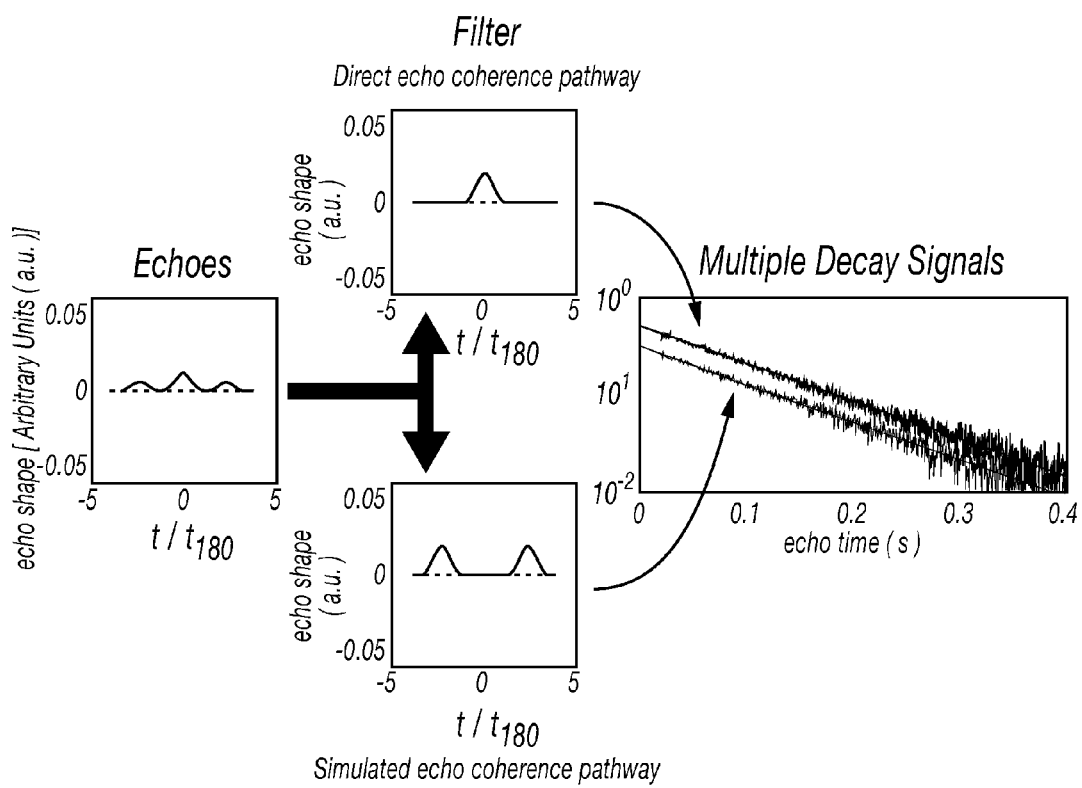
FIG. 12A is a graph of an example of a single full echo out of a CPMG decay.
FIG. 12B are graphs of direct (top graph) and simulated (bottom graph) echoes that cumulatively form the full echo of the example CPMG decay in FIG. 12A.
FIG. 12C is a graph of the pair of decays of the direct and simulated echoes of FIG. 12B.

In another aspect, a matched (e.g., matching) filter (e.g., a digital or analog filter) may include designing the filter to extract a certain component (such as D, $T_1$, and/or $T_2$) and/or shape of the NMR echo signal. In this aspect, multiple NMR parameters may be encoded and extracted from the NMR echo signal (e.g., of the NMR echo data set). For example, an echo shape may be selected to isolate multiple different decaying signals within the CPMG (e.g., a series of magnetic field pulses) acquisition. In one aspect, this matched filter may be used to simultaneously obtain $T_1$ and $T_2$. In another aspect, this matched filter may be used to simultaneously obtain D and $T_2$. Furthermore, a transmitted magnetic field pulse sequence may be modified such that the echo signals are orthogonal by making one echo signal symmetric and the other anti-symmetric or separated in time as shown in FIGS. 12A-12C. FIG. 12A is a graph of an example of a full echo of a CPMG decay. Note that $t_{180}$ generally refers to the duration of a nominal 180° pulse in a CPMG pulse sequence with $t_{180}=\pi/\omega_1$ and $\omega_1$ being an average nutation frequency for the NMR instrument. $t_{180}$ may also be defined as the pulse length which optimally refocuses the echo signal in the CPMG experiment for the NMR instrument. FIG. 12B are graphs of direct (top graph) and simulated (bottom graph) echoes that cumulatively form the full echo of the CPMG decay in FIG. 12A. FIG. 12C is a graph of the pair of decays of the direct and simulated echoes of FIG. 12B.

Particularly, multiple matching filters may be used to extract multiple signals from each echo (e.g., a composite echo signal formed from a central signal and two substantially identical trailing and leading signals, which two signals may be referred to as simulated echoes) of a CPMG decay. In this aspect, the CPMG sequence may be selected to produce stimulated and direct echoes with distinct shapes to simultaneously encode for D and $T_2$. A full echo (e.g., echo shape) example is shown FIG. 12A (where a.u. is arbitrary units). The depicted direct and stimulated echo shapes may each be used to generate a pair of orthogonal (e.g., distinct) matched filters, e.g., one filter matched to the direct echo (e.g., top graph in FIG. 12B) and another filter matched to the simulated echoes (e.g., the bottom graph in FIG. 12B) to extract the pair of decays shown in the graph of FIG. 12C, accordingly. For example, multiple filters may be selected from a plurality of filters (e.g., from at least two filters or from at least three filters), for example, to maximize a peak signal-to-noise ratio. Each filter of the multiple filters may be selected to encode for a different signal, e.g., a first filter may encode for $T_1$, a second filter may encode for $T_2$, a third filter may encode for D, etc.

In one aspect, a matched filter may be selected to yield substantially consistent NMR echo data (e.g., signal) amplitude. For example, the form (e.g., shape) of an echo signal may vary during a (e.g., logging) measurement of the NMR echo signal. For example, a change in Q or analog filtering may occur during (e.g., a logging) measurement due to a change in temperature or loading of the antenna, as non-limiting examples. Changes in Q and analog filtering may cause the shape and/or timing of the echo data (e.g., signal) to change. A matched filter that maximizes other responses besides SNR may be utilized (e.g., reducing sensitivity to changes in the SNR).

In another aspect a matched (e.g., matching) filter includes a point-by-point apodization function or equivalently a windowing of the signal or applying an inner-product to the signal. For example, in one aspect digital filtering and a convolution calculation may not be used but instead the matched filter may include performing an apodization function, e.g., by applying a single multiplication of a number from a filter function to each signal sample. This may be done by taking the inner-product of the signal with a filter function then adding together the apodized data over the duration of the echo. This procedure may be conveniently implemented as a multiply-accumulate (MAC) computation. Note that both the signal and the apodization function may be complex quantities, i.e., composed of real and imaginary parts. This filtering process may be equivalent to calculating the convolved signal y(t) at a single instant in time, typically at t=0 (e.g., where maximum SNR is obtained). The resulting output, denoted by y(0), may still allow improving SNR, robustness, and/or extracting echo shape but with very modest computing resources. For example, in FIGS. 13A-13C, a matching filter is based on an apodization (or a window) function by taking the acquired echo signal, e.g., the full, raw echo $s_{\{rx\}(t)}$ of a CPMG decay, as in FIG. 13A and then multiplying the echo signal $s_{\{rx\}(t)}$ point by point with a (e.g., Gaussian shaped) apodization function (e.g., as depicted as a dashed line in FIG. 13B with the echo signal $s_{\{rx\}(t)}$ as the solid line in FIG. 13B) so to produce a filtered (e.g., apodized) echo signal as in FIG. 13C, e.g., with improved SNR. A filtered echo signal may be summed over an interval to determine the according echo amplitude (e.g., intensity).

In another aspect, a matching filter may be dynamically adjustable (e.g., via a processor). For example, different echo shapes may be desired to be filtered or the echo shape may change, e.g., depending on the environment. Dynamically changing the filter (e.g., during use) may allow the NMR echo processing module to adjust to changes in conditions or extract different information. This may be done manually (e.g., by the operator) or automatically as specified within a program (e.g., software, hardware, or firmware) controlling the NMR echo processing module. Automatically detecting changes in conditions and producing the corresponding adjustments to the filter may be based on external data or measurements from the device itself, for example, based on the filtered echo signal(s), the measurement of coil Q, temperature, magnetic field (e.g., via a Hall probe) measurements, transmitter pulse power, etc.

In yet another aspect, a matching filter may include multiple discrete filters for each echo. For example, the output from multiple, different filters may be computed from echo data (e.g., signal) acquired from a given echo. This may allow different possible applications, such as, but not limited to, extracting multiple echo shapes for the "single-shot" techniques based on encoding different signals as different echo shapes; monitoring the echo data (e.g., signal) and retaining the information available from different filters to detect changes in the echo shape or position, where such information may then in turn be used to dynamically adjust the filter; monitoring the echo signal and retaining the information available from different filters to enable the use of optimal SNR filters with poor or modest stability to changes in the signal, e.g., by computing and collecting the results from multiple filters where some favor optimizing SNR and others favor optimizing stability, there may be a backup stable signal from an according filter in case the SNR optimized filter becomes undesirable (e.g., fails to meet a desired performance). For example, FIGS. 14A-14C depict a dynamically adjustable filter to match the change(s) in a signal (e.g., a magnetic field pulse). In this example, the (e.g., apparent center of the) signal shifts to a different time, e.g., the original signal shown with a solid line and the time shifted signal (e.g., echo) shown as a dotted line, which may occur due to a change in a receiver's and/or transmitter's (e.g., antenna's) Q. For a non-matched filter (e.g., a filter fit to the non-time shifted signal), a shift may cause the non-matched filter to decrease rather than improve SNR. FIG. 14B are graphs of a fixed, non-matched window filter (solid line in the top graph and the bottom graph) and a (e.g., time) adjusted, matching filter (the dashed line in the bottom graph). FIG. 14C are graphs of shifted echo data after filtering with the fixed, non-matched window filter (top graph, where the dashed line shows the filtered data and the solid line shows the non-time shifted signal) and with the adjusted, matching filter (bottom graph, where the dashed line shows the filtered data and the solid line shows the non-time shifted signal). The reduction in the (e.g., maximum) height of the non-matched filter (the dashed line in the top graph) may indicate a degradation in its performance compared to the (e.g., maximum) height of the matched filter (the dashed line in the bottom graph). Thus a filter dynamically adjustable to match change(s) in the echo data (e.g., signal) may retain the desired performance (e.g., desired SNR).

Figure 15:
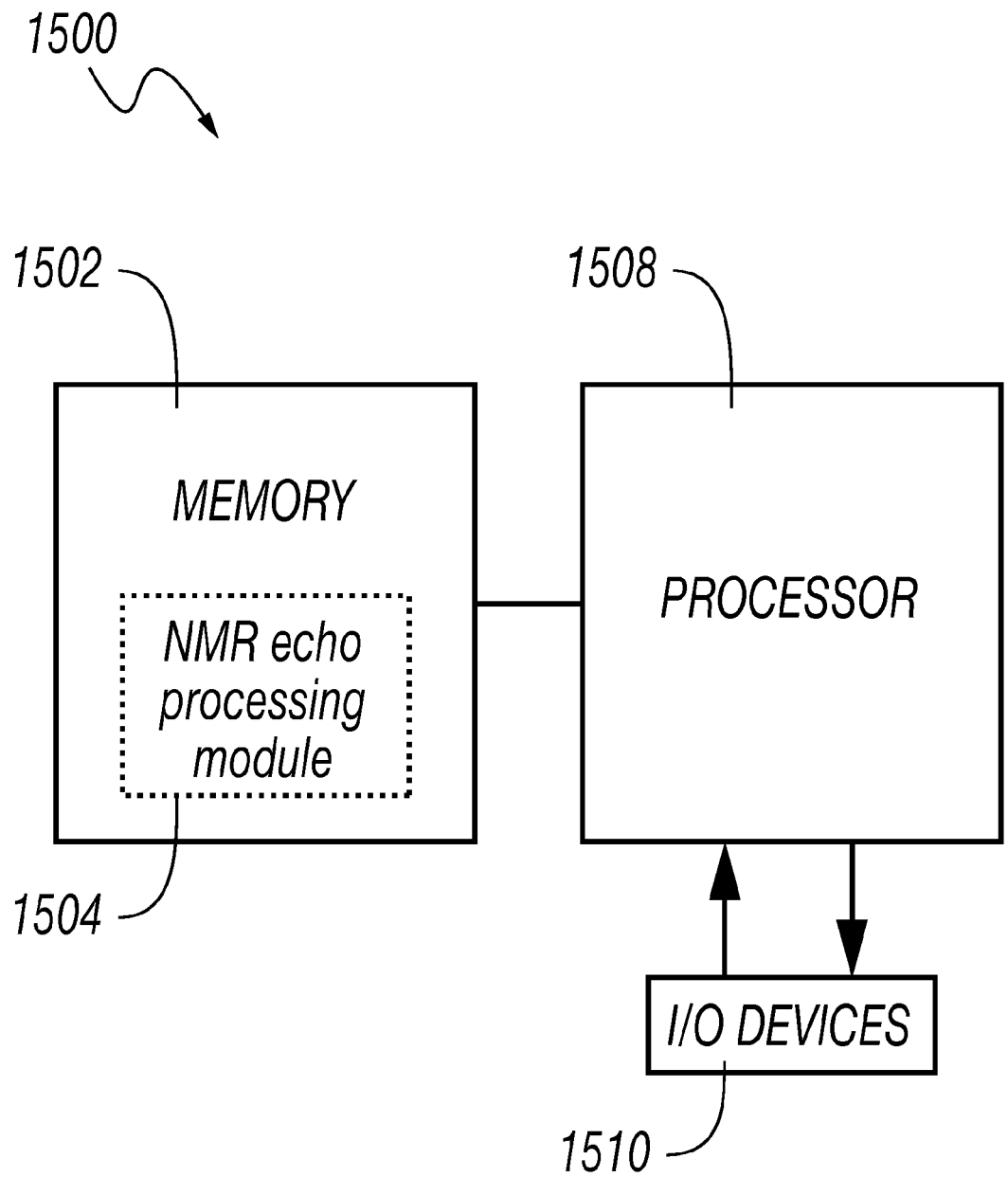
FIG. 15 illustrates an aspect of a block diagram of a computer architecture.

FIG. 15 illustrates an aspect of a block diagram 1500 of a computer architecture. Various I/O devices 1510 may be coupled (e.g., via a bus) to processor 1508, for example, a keyboard, mouse, audio device, display device, and/or communication device. Memory 1502 may be coupled to processor 1508. Memory 1502 may include a disk drive or other (e.g., mass) data storage device which may include instructions/code and data, in one aspect. Note that other architectures are possible.

Aspects of the disclosure disclosed herein may be implemented in hardware, software, firmware, or a combination of such implementation approaches. Aspects of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions and methods described herein and generate output information (e.g., a matched filter or filtered NMR echo data). The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. The disclosure herein is not limited in scope to any particular programming language. The language may be a compiled or interpreted language.

One or more aspects may be implemented by representative instructions stored on a machine-readable medium which represents various logic within the processor, which when read by a machine causes the machine to fabricate logic to perform the techniques described herein. Such implementations may be stored on a tangible, non-transitory machine readable medium.

Such machine-readable storage mediums may include, without limitation, non-transitory, tangible arrangements of articles manufactured or formed by a machine or device, including storage media such as hard disks, any other type of disk including floppy disks, optical disks, compact disks (e.g., CD-ROMs or CD-RWs), and magneto-optical disks, semiconductor devices such as read memories (ROMs, random access memories (RAMs) such as dynamic random access memories (DRAMs), static random access memories (SRAMs), erasable programmable read memories (EPROMs), flash memories, electrically erasable programmable read memories (EEPROMs), phase change memory (PCM), magnetic or optical cards, or any other type of media suitable for storing electronic instructions.

Accordingly, aspects of the disclosure also include non-transitory, tangible machine-readable media containing instructions or containing design data, such as Hardware Description Language (HDL), which defines structures, circuits, apparatuses, processors and/or system features described herein. Such aspects may also be referred to as program products. Modules may be implemented in software, hardware, firmware, or a combination thereof. The instruction converter may be on processor, off processor, or part on and part off processor.

In one aspect, memory 1502 is a non-transitory machine readable storage medium having instructions that, when executed, causes a machine to perform a method according to the above disclosure. Particularly, memory 1502 may contain an NMR echo processing module 1504. NMR echo processing module 1504 may include instructions that, when executed, causes the processor to perform a method of matching a filter of an NMR system to a transmitter's outputted magnetic field pulse and/or filtering NMR echo data with a matched filter to output a filtered NMR echo data set, e.g., according to the disclosure above.

Figure 16:
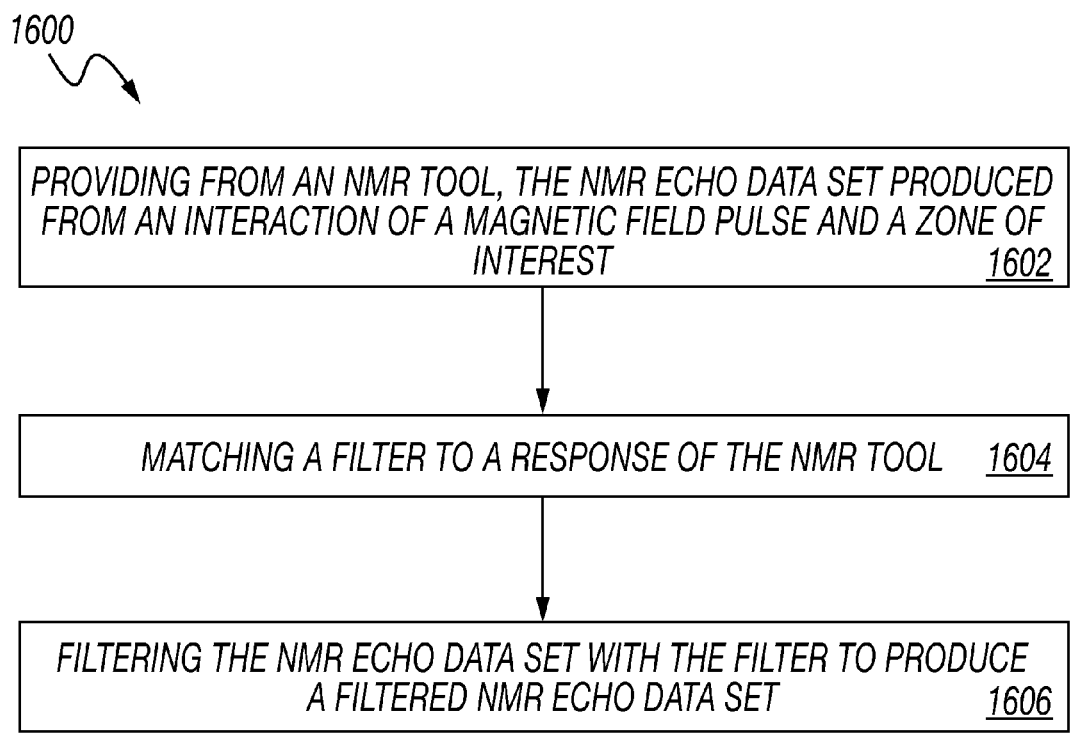
FIG. 16 illustrates an aspect of a method of processing an NMR echo data set.

FIG. 16 illustrates an aspect of a method 1600 of processing an NMR echo data set. This example method 1600 includes providing (e.g., from an NMR tool) the NMR echo data set produced from an interaction of a magnetic field pulse and a zone of interest 1602, matching a filter to a response of the NMR tool 1604, and filtering the NMR echo data set with the filter to produce a filtered NMR echo data set 1606.

While the specific aspects described above have been shown by way of example, it will be appreciated that many modifications and other aspects will come to the mind of one skilled in the art having the benefit of the teachings presented in the foregoing description and the associated drawings. Accordingly, it is understood that various modifications and aspects are intended to be included within the scope of the appended claims.

What is claimed is:

1. A nuclear magnetic resonance (NMR) system comprising:
   a transmitter of an NMR tool to output a magnetic field pulse into a zone of interest;
   a receiver of the NMR tool to output an NMR echo data set produced from an interaction of the magnetic field pulse and the zone of interest; and
   an NMR echo processing module including a filter matched to a response of the NMR tool to output a filtered NMR echo data set from the NMR echo data set, wherein the filter is matched to an echo shape of the NMR echo data.

2. The nuclear magnetic resonance system of claim 1 wherein the filter removes a Larmor resonant frequency from the NMR echo data set.

3. The nuclear magnetic resonance system of claim 1 wherein the echo shape of the NMR echo data is approximated by a Gaussian function or a truncated Gaussian function.

4. The nuclear magnetic resonance system of claim 1 wherein the filter is further matched to a baseband signal of the NMR echo data set.

5. The nuclear magnetic resonance system of claim 1 wherein the filter is further matched to an intermediate frequency signal of the NMR echo data set.

6. The nuclear magnetic resonance system of claim 1 wherein the filter retains a Larmor resonant frequency in the NMR echo data set.

7. The nuclear magnetic resonance system of claim 1 wherein the NMR echo processing module further comprises a whitening filter to convert colored noise in the NMR echo data set to white noise.

8. The nuclear magnetic resonance system of claim 1 wherein the filter is matched to an echo shape of the NMR echo data to maximize a peak signal-to-noise ratio.

9. The nuclear magnetic resonance system of claim 1 wherein the filter comprises a point-by-point apodization function.

10. The nuclear magnetic resonance system of claim 1 wherein the NMR echo processing module selects the filter from a plurality of filters to maximize a peak signal-to-noise ratio.

11. The nuclear magnetic resonance system of claim 1 wherein the NMR echo processing module selects multiple filters from at least three filters to maximize a peak signal-to-noise ratio, wherein each of the multiple filters encodes for a different signal.

12. The nuclear magnetic resonance system of claim 1 wherein the filter is matched to an input or output magnetic field pulse of the transmitter.

13. The nuclear magnetic resonance system of claim 1, wherein the filter is matched to an echo shape produced by the transmitter and the receiver prior to deployment in a subterranean wellbore.

14. The nuclear magnetic resonance system of claim 1, wherein (i) the transmitter is configured to output a Carr-Purcell-Meiboom-Gill (CPMG) pulse sequence and (ii) the filter is further matched for the CPMG pulse sequence.

15. The nuclear magnetic resonance system of claim 1, wherein the filter is configured to extract at least one of a longitudinal relaxation time ($T_1$), a transverse relaxation time ($T_2$), and a diffusion coefficient (D) from the NMR echo data set.

16. The nuclear magnetic resonance system of claim 15, wherein the filter comprises first, second, and third filters, the first filter configured to extract $T_1$, the second filter configured to extract $T_2$, and the third filter configured to extract D from the NMR echo data set.

17. A nuclear magnetic resonance (NMR) system comprising:
 a transmitter of an NMR tool to output a magnetic field pulse into a zone of interest;
 a receiver of the NMR tool to output an NMR echo data set produced from an interaction of the magnetic field pulse and the zone of interest; and
 an NMR echo processing module including a filter matched to a response of the NMR tool to output a filtered NMR echo data set from the NMR echo data set, wherein the filter is matched to an average of a selected signal spectra of the NMR echo data set.

18. A nuclear magnetic resonance (NMR) system comprising:
 a transmitter of an NMR tool to output a magnetic field pulse into a zone of interest;
 a receiver of the NMR tool to output an NMR echo data set produced from an interaction of the magnetic field pulse and the zone of interest; and
 an NMR echo processing module including a filter matched to a response of the NMR tool to output a filtered NMR echo data set from the NMR echo data set, wherein the filter dynamically changes in response to a measurement.

19. The nuclear magnetic resonance system of claim 18 wherein the measurement comprises a signal strength of the interaction of the magnetic field pulse and the zone of interest.

20. The nuclear magnetic resonance system of claim 18 wherein the measurement comprises at least one of a quality factor (Q) of the receiver, a temperature of the receiver, a magnetic field strength, and a pulse power of the transmitter.

* * * * *